US009114849B2

(12) United States Patent  (10) Patent No.: US 9,114,849 B2
Choppla  (45) Date of Patent: Aug. 25, 2015

(54) STUDENT, TEACHER, ADMINISTRATIVE AND RESEARCH COORDINATING HELPER

(71) Applicant: Gulshan Prem Choppla, Montezuma, GA (US)

(72) Inventor: Gulshan Prem Choppla, Montezuma, GA (US)

( * ) Notice: Subject to any disclaimer, the term of this patent is extended or adjusted under 35 U.S.C. 154(b) by 1 day.

(21) Appl. No.: 13/873,012

(22) Filed: Apr. 29, 2013

(65) Prior Publication Data

US 2014/0319796 A1 Oct. 30, 2014

(51) Int. Cl.
*B62M 1/24* (2013.01)
*B62M 1/36* (2013.01)
*G09B 19/00* (2006.01)

(52) U.S. Cl.
CPC . *B62M 1/36* (2013.01); *B62M 1/24* (2013.01); *G09B 19/00* (2013.01)

(58) Field of Classification Search
CPC ............ B62K 9/02; B62M 1/24; B62M 1/36; B62M 23/00; B62M 3/06; B62M 5/00
USPC .......................... 280/205, 209, 259, 261, 263
See application file for complete search history.

(56) References Cited

U.S. PATENT DOCUMENTS

| 5,129,664 | A | * | 7/1992 | Chen .............................. 280/221 |
| 5,421,794 | A | * | 6/1995 | Du ................................... 482/57 |
| 5,997,019 | A | * | 12/1999 | Hoerz ............................ 280/209 |
| 6,129,366 | A | * | 10/2000 | Dettmann et al. ......... 280/47.35 |
| 6,676,146 | B2 | * | 1/2004 | Boyd ............................. 280/205 |
| 7,302,717 | B2 | * | 12/2007 | Reinke et al. ..................... 5/86.1 |
| 2001/0040352 | A1 | * | 11/2001 | Wang et al. ................. 280/87.01 |
| 2003/0028588 | A1 | * | 2/2003 | McConnell et al. .......... 709/203 |
| 2008/0000171 | A1 | * | 1/2008 | McKay et al. ................. 52/36.1 |
| 2008/0106173 | A1 | * | 5/2008 | Konopka ........................ 312/35 |
| 2013/0299251 | A1 | * | 11/2013 | Wilson et al. .................. 180/2.2 |

* cited by examiner

*Primary Examiner* — Joseph Rocca
*Assistant Examiner* — Marc A Scharich
(74) *Attorney, Agent, or Firm* — Crose Law LLC; Bradley D. Crose

(57) ABSTRACT

A digital podium apparatus includes a base, front and rear pairs of wheels and a single wheel at a front of the base. A pair of front pedals can be moved by a user's toes to rotate the front wheels forward and a pair of rear pedals can moved by the user's ankles to rotate the rear wheels backward. A divider is disposed between the front and rear pedals. A height-adjustable pole is coupled to both the single wheel and a digital podium frame. A handle is disposed on the digital podium frame, and the user can change a direction of the base during movement of the digital podium apparatus by rotating the handle. A plurality of computer tablets are disposed on the digital podium frame. The digital podium apparatus may be ridden into a classroom and used to project and relay teaching material to students in the classroom.

8 Claims, 51 Drawing Sheets

Digital podium (upright) top to bottom view

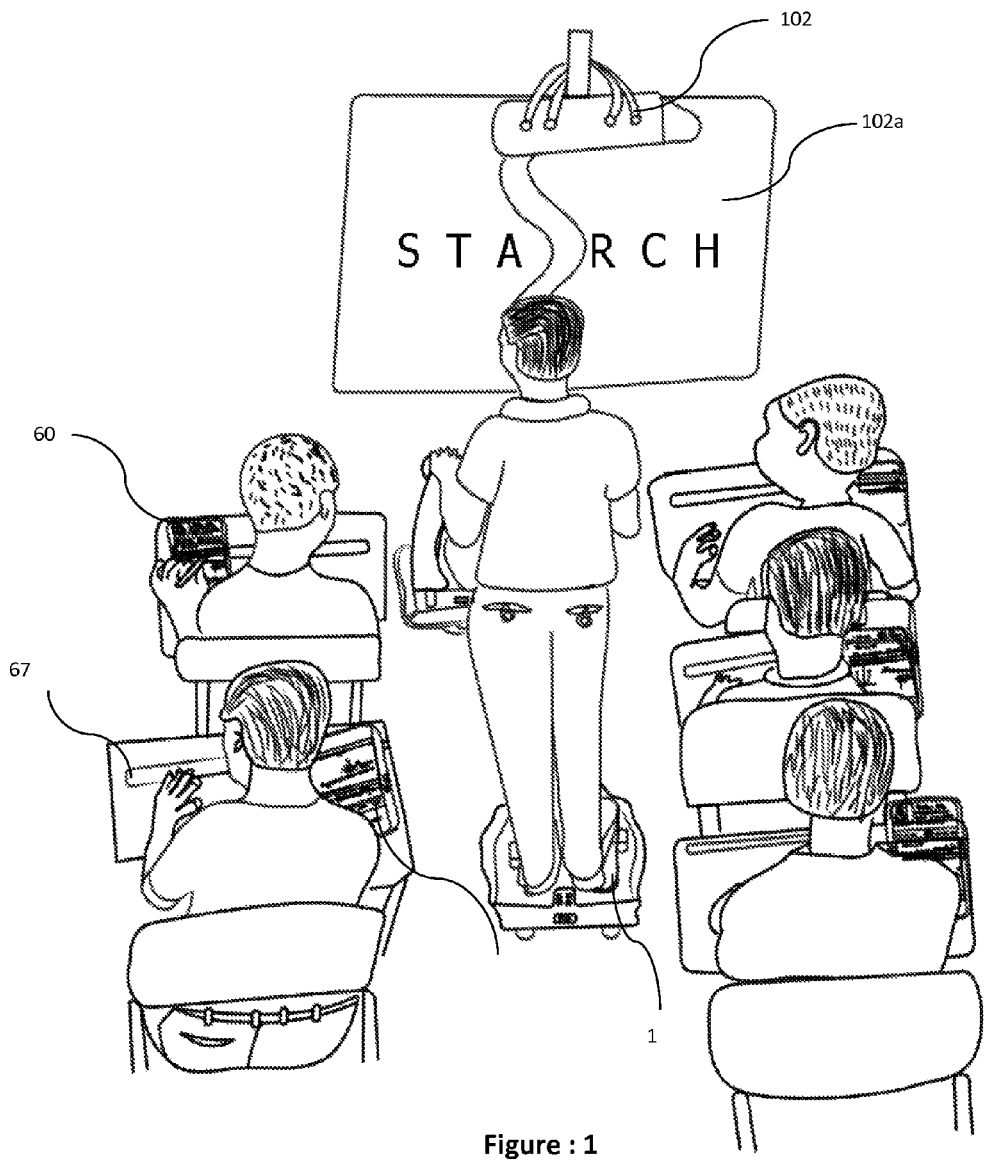
Figure: 1

Digital podium (upright) top to bottom view
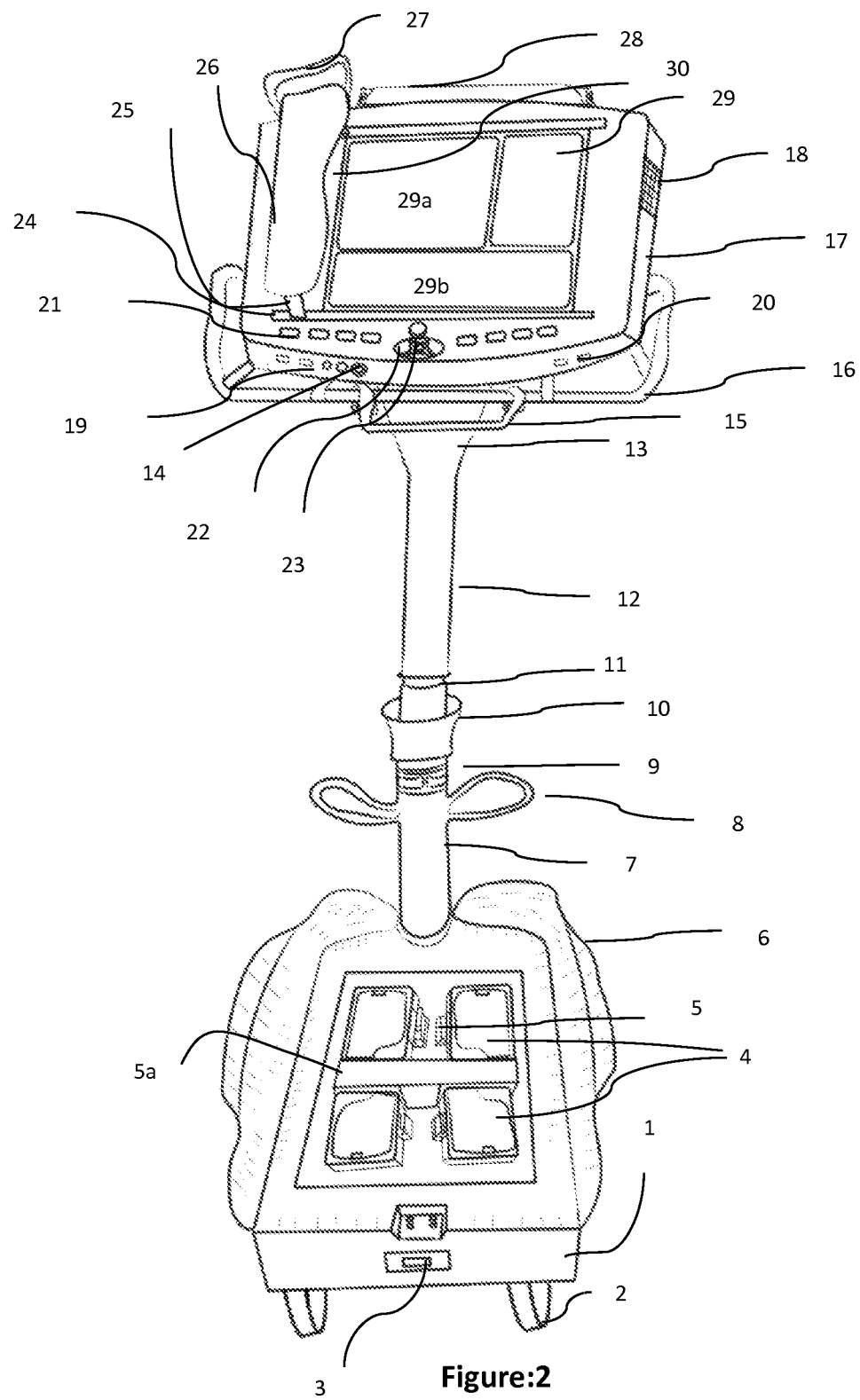
Figure:2

Digital Podium– side view
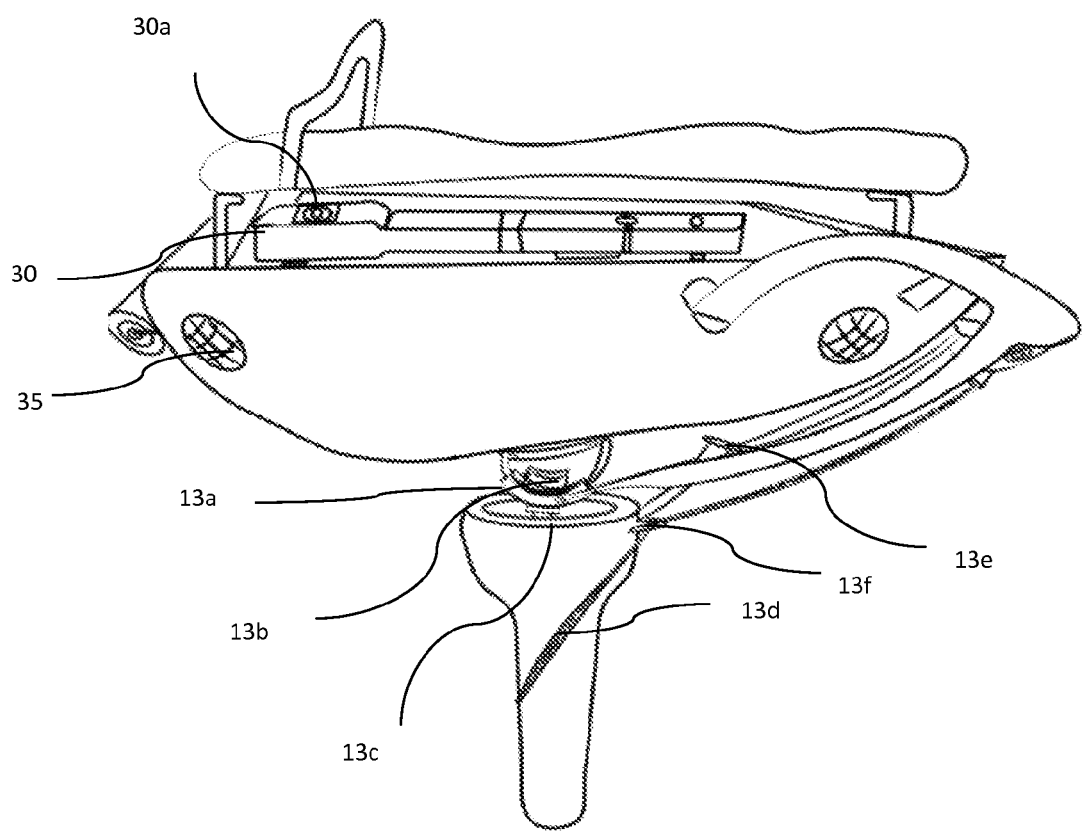
Figure: 3

Multi-tab frame first layer and tab-3, inserting into frame
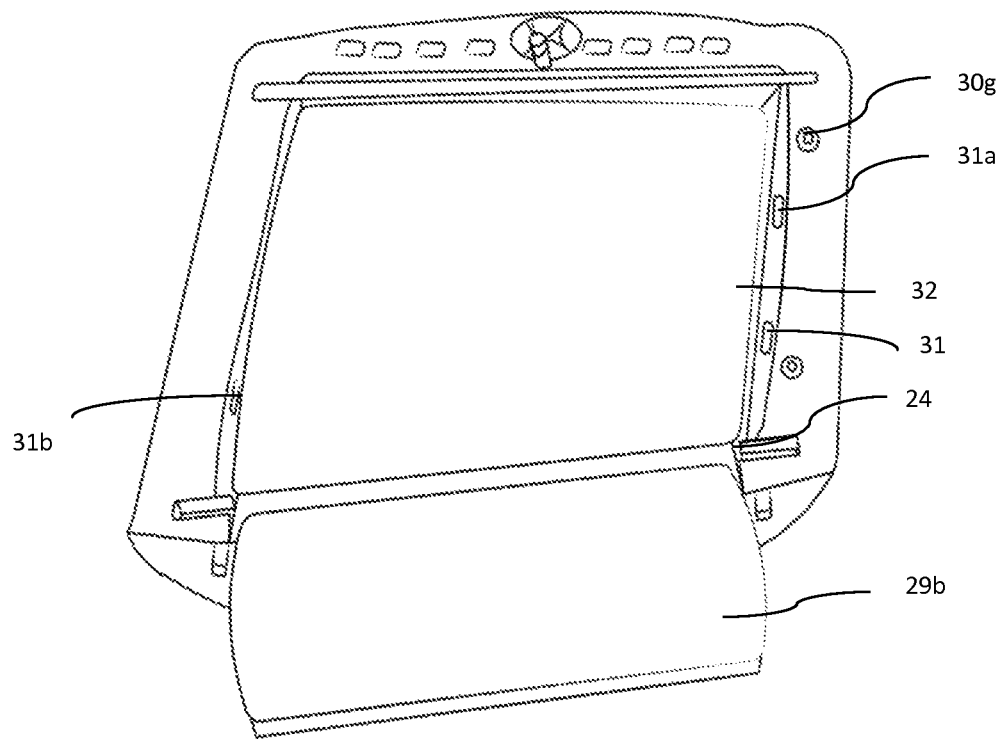
Figure :4

Multi-Tab , dual cam and microphone arrangement view
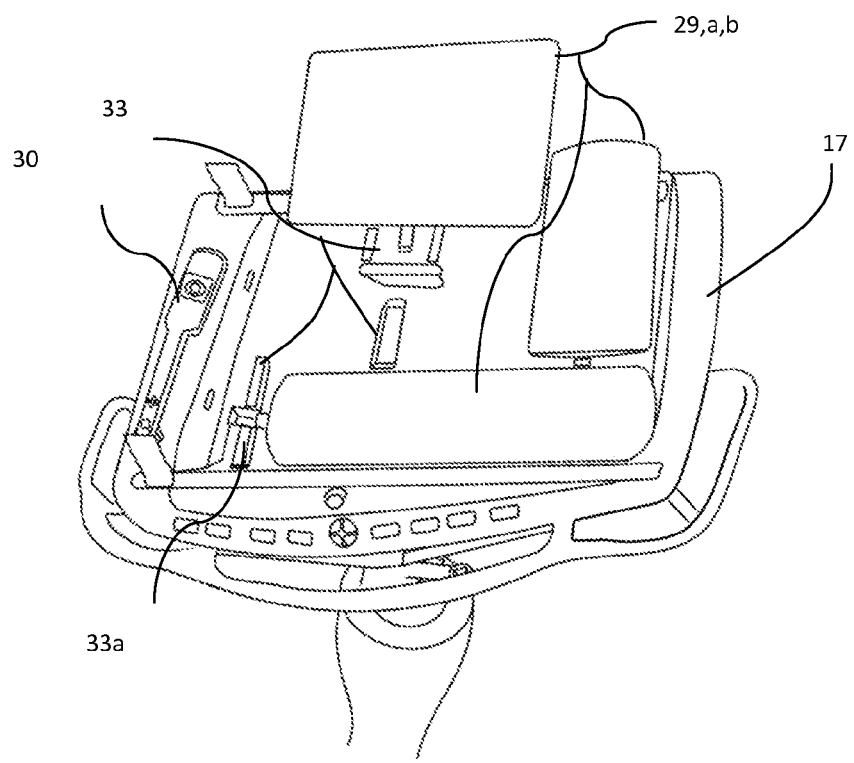
Figure: 5

Multi– Tab arrangement and front view of mini projector
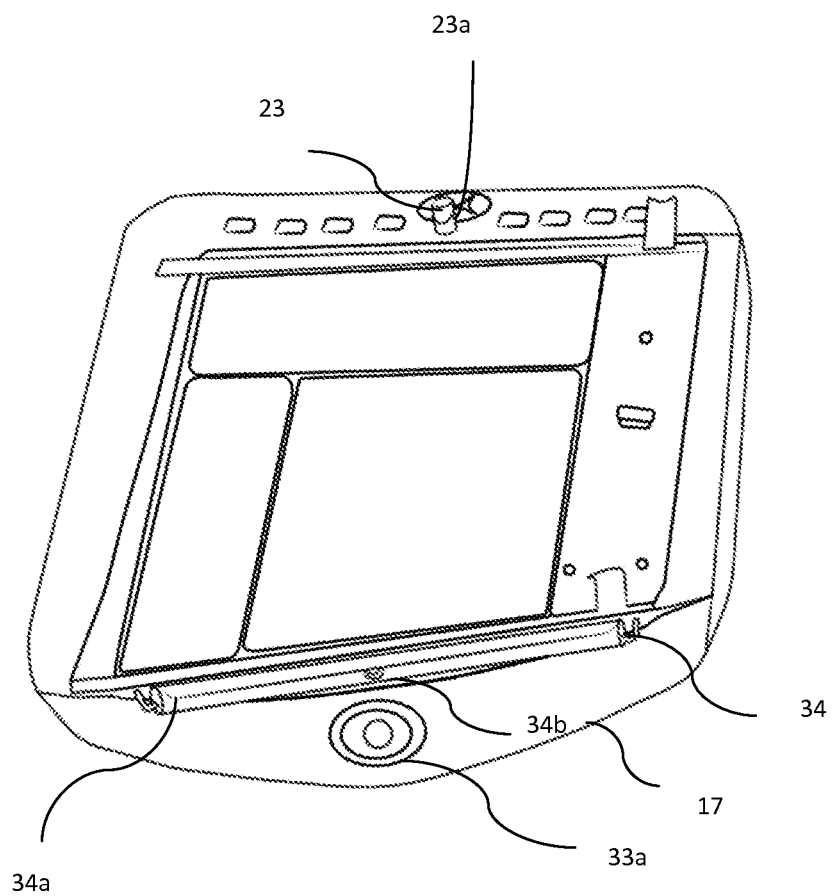
Figure : 6

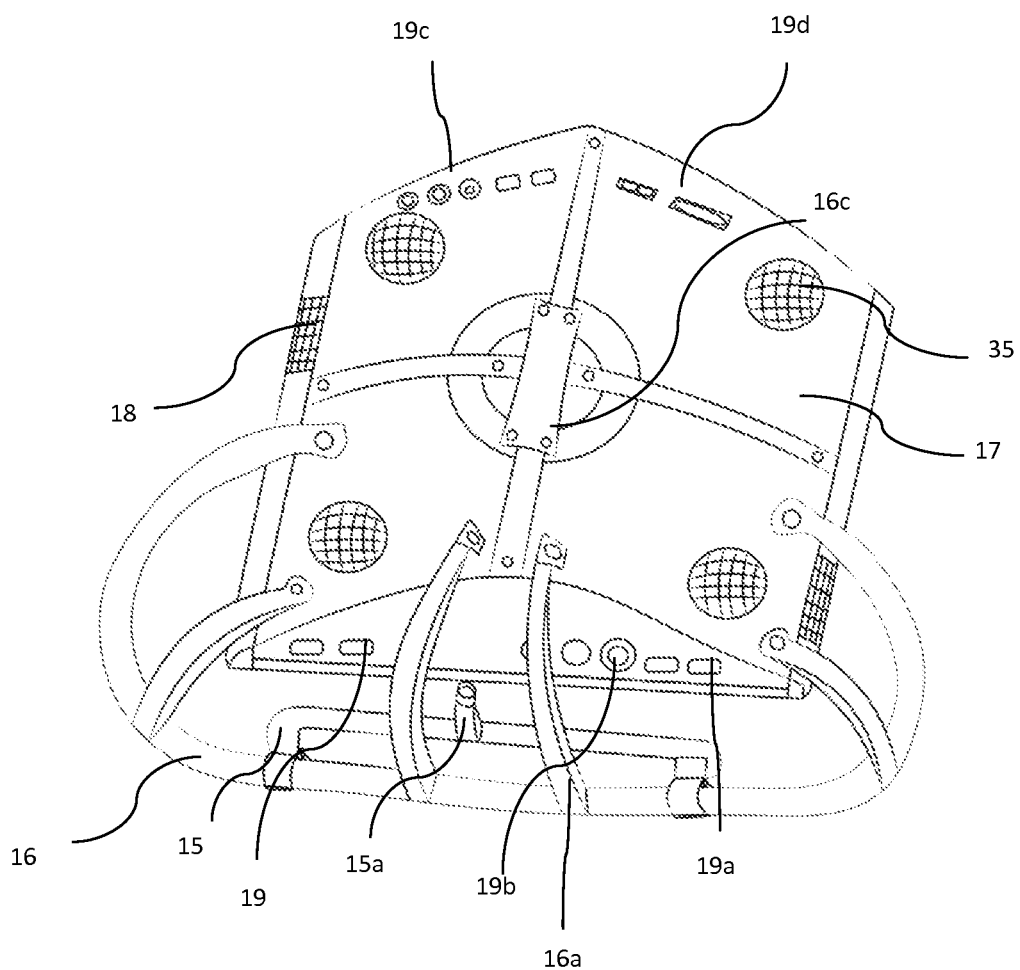
Figure: 7

Multi- Tab internal layers
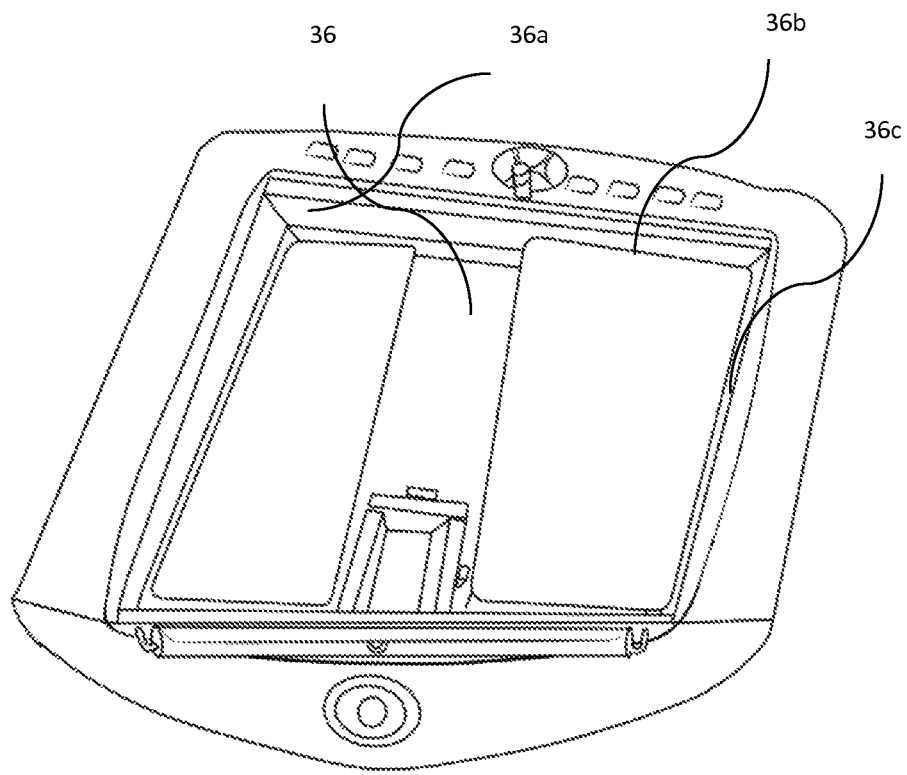
Figure: 8

Multi – Tab Internal layer and mini laser projector arrangement
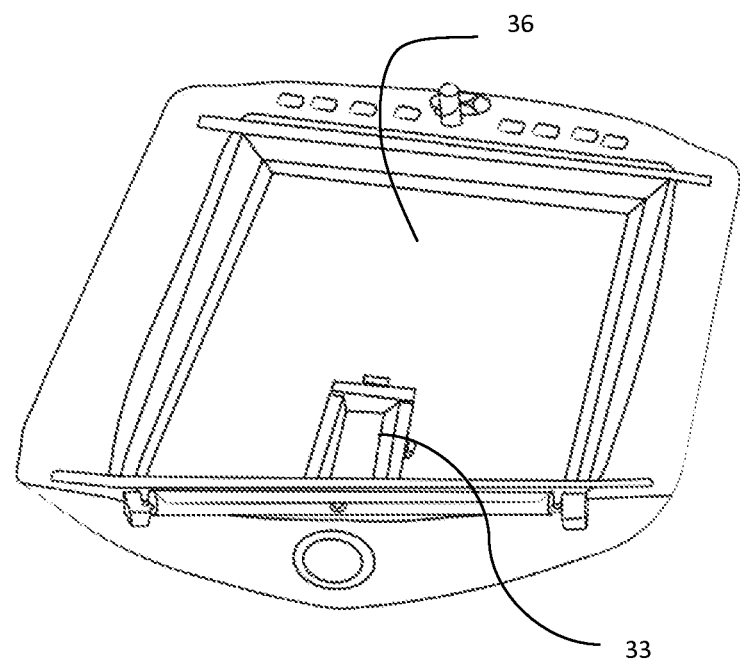
Figure: 9

Ball baring clamp - connects podium pole and multi- tab frame
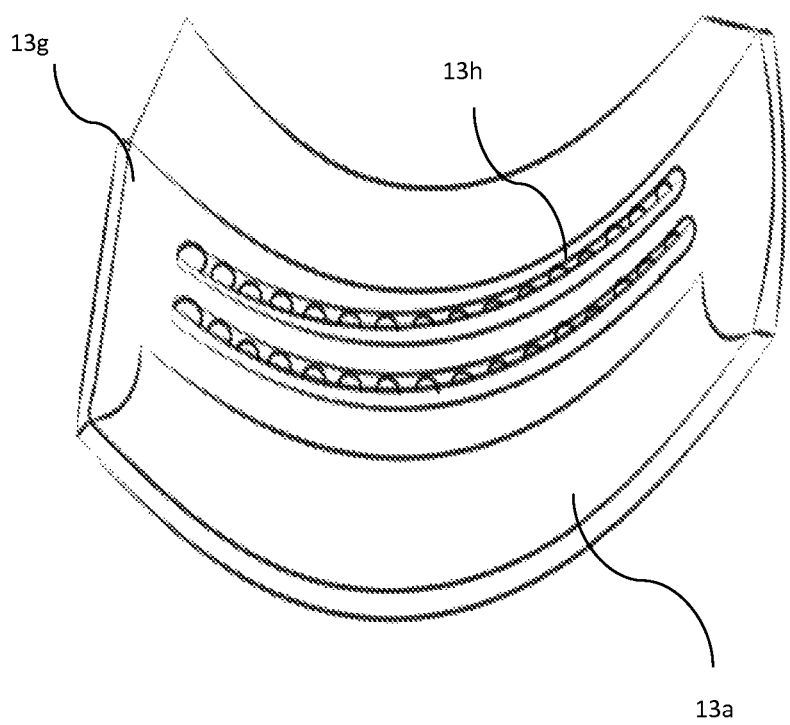
Figure: 10

Ball baring clamp welded to a round pipe
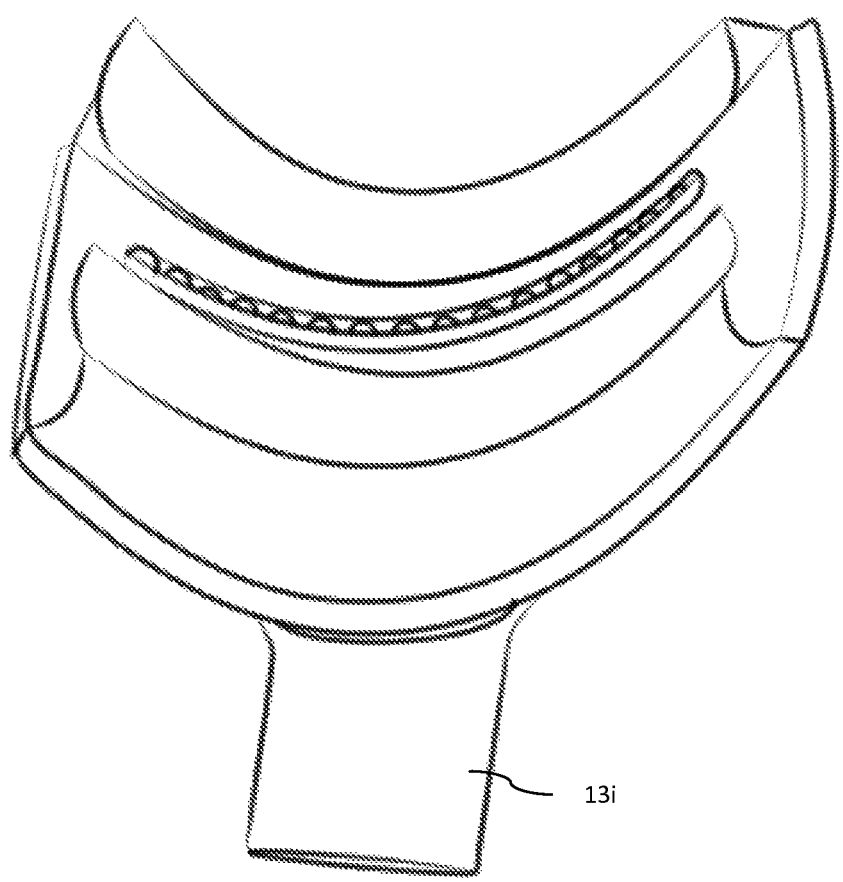
Figure: 11

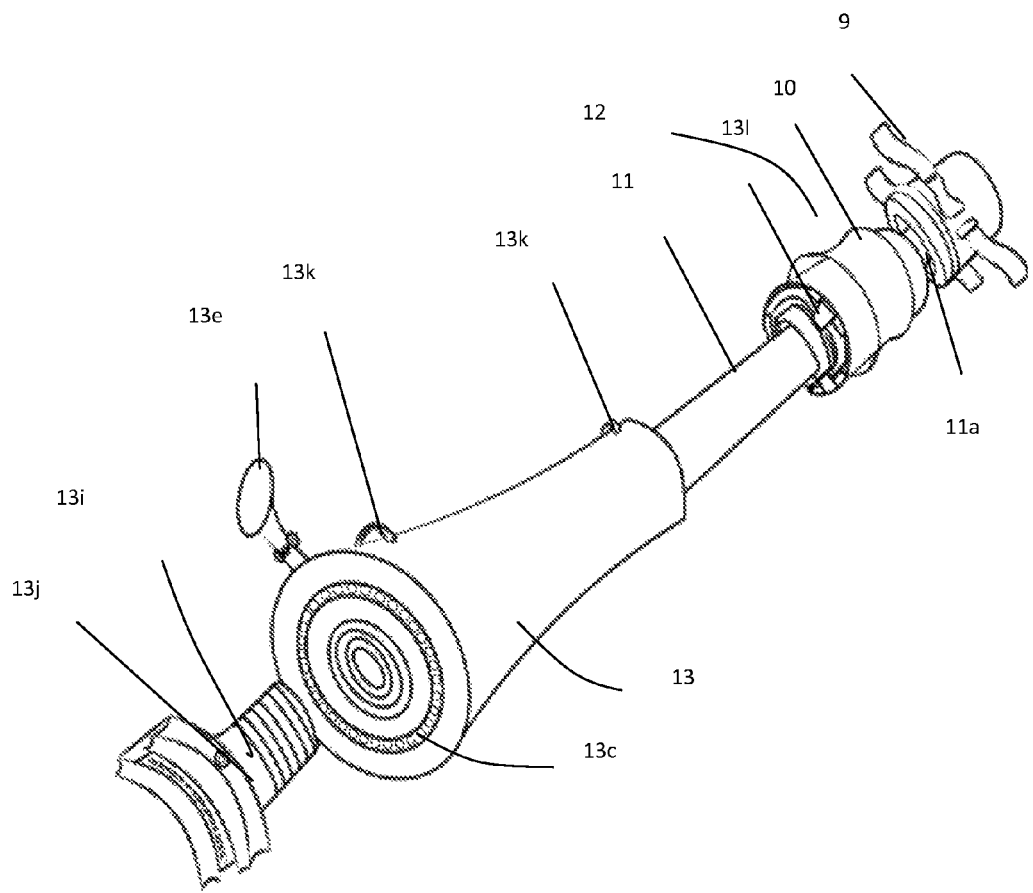
Figure: 12

Round iron ring clamp with flat mounting plate—mounted in ball baring clamp
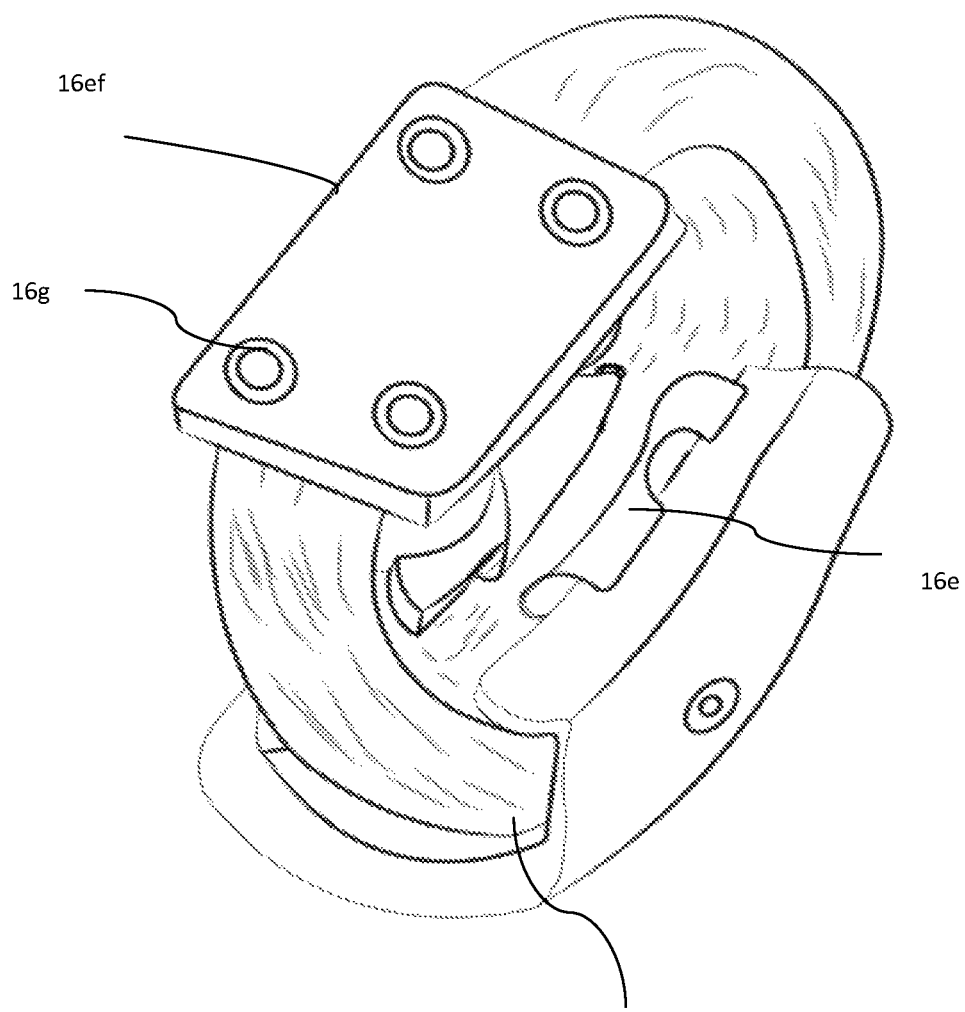
Figure: 13

Pedal five wheel for Podium
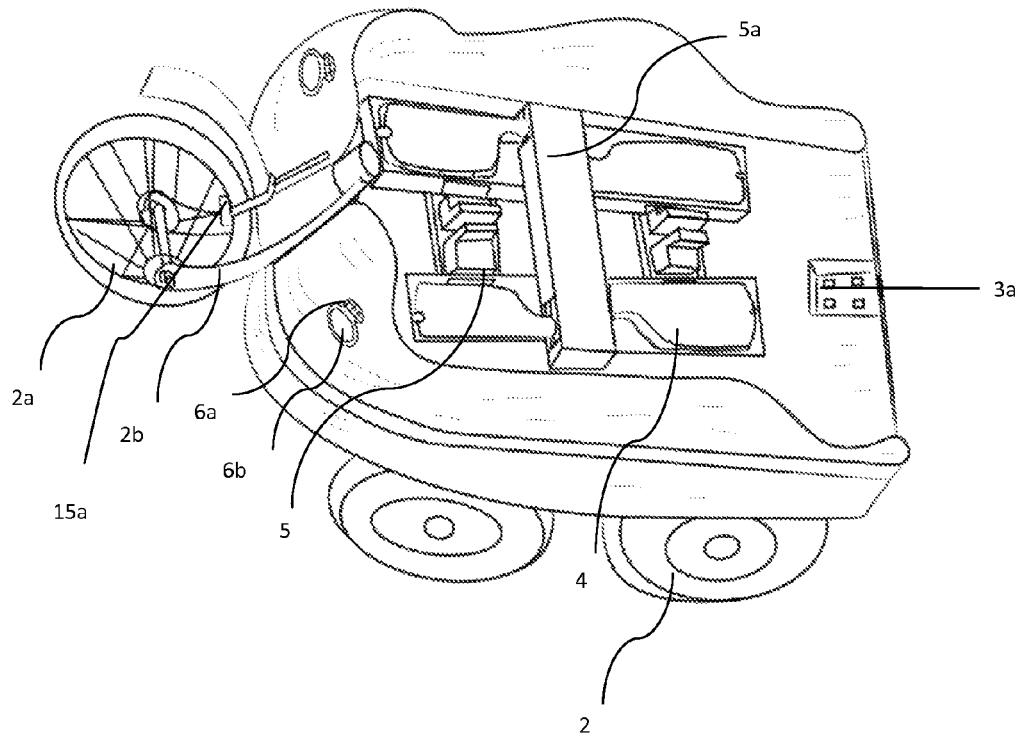
Figure: 14

Podium supporting pole and handle back view
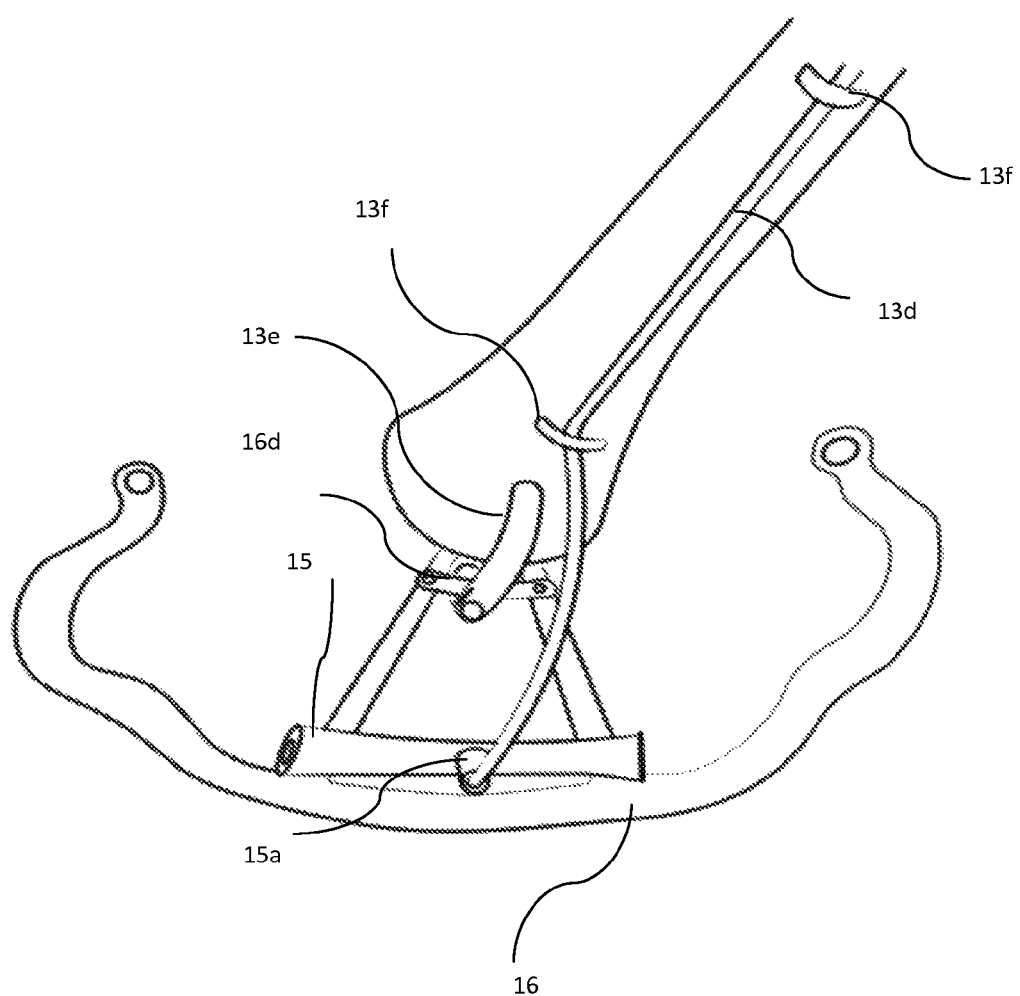
Figure : 15

Custom Punched one and half inch iron bar
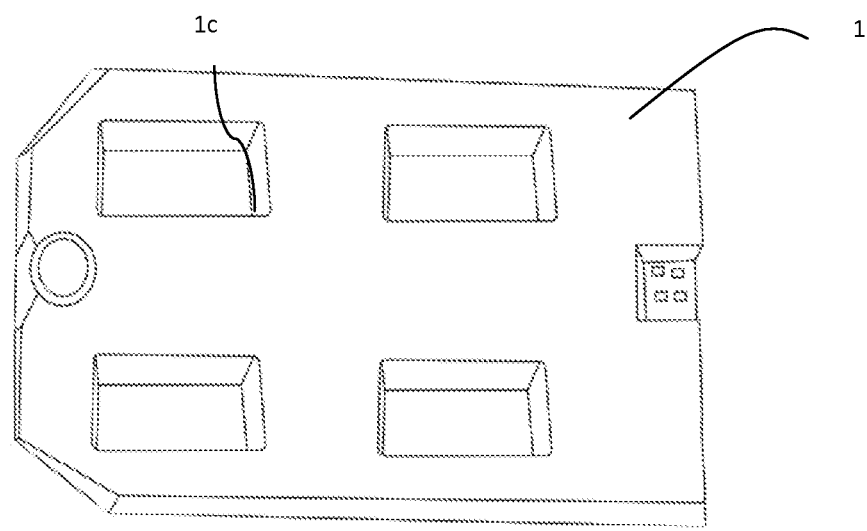
Figure: 16

Pedal four Wheel base and its Internal parts
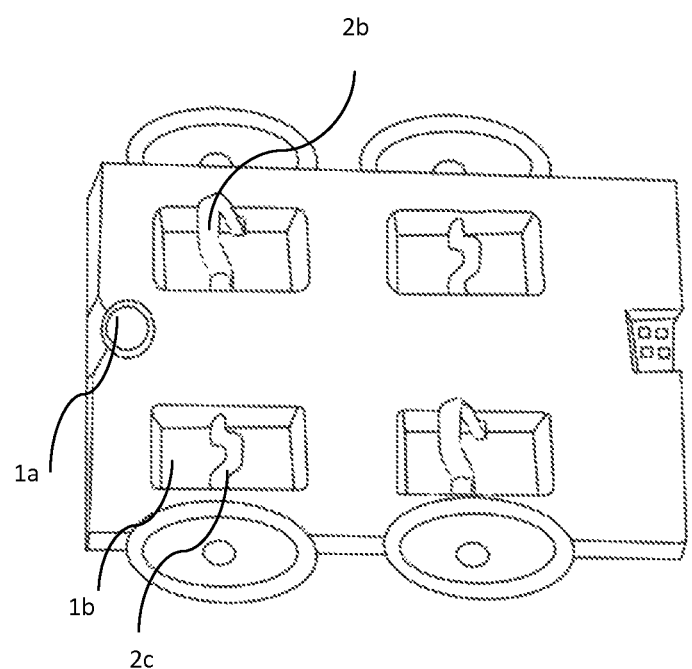
Figure: 17

Pedal Wheel Mechanism
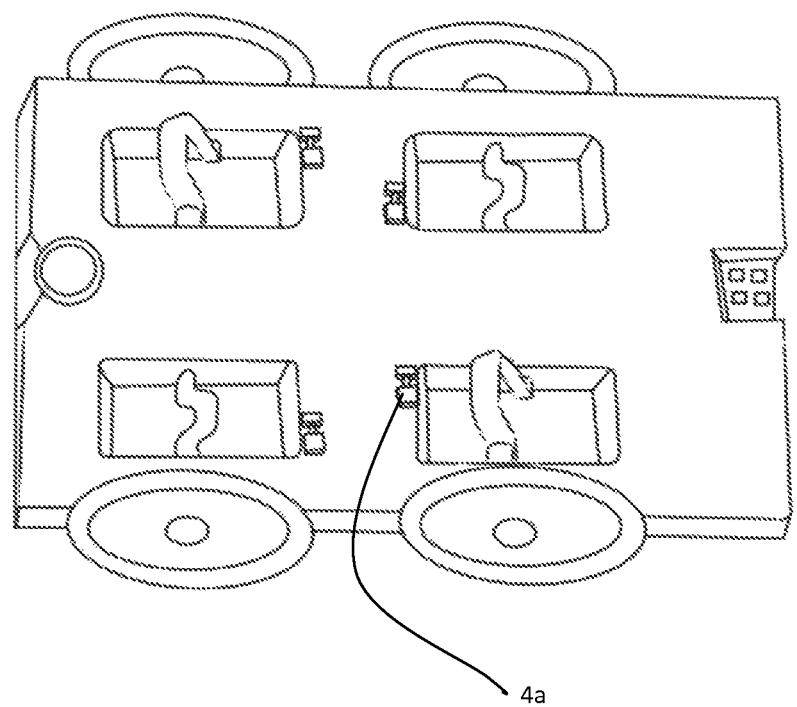
Figure: 18

Pedal arrangement in podium four square spaces
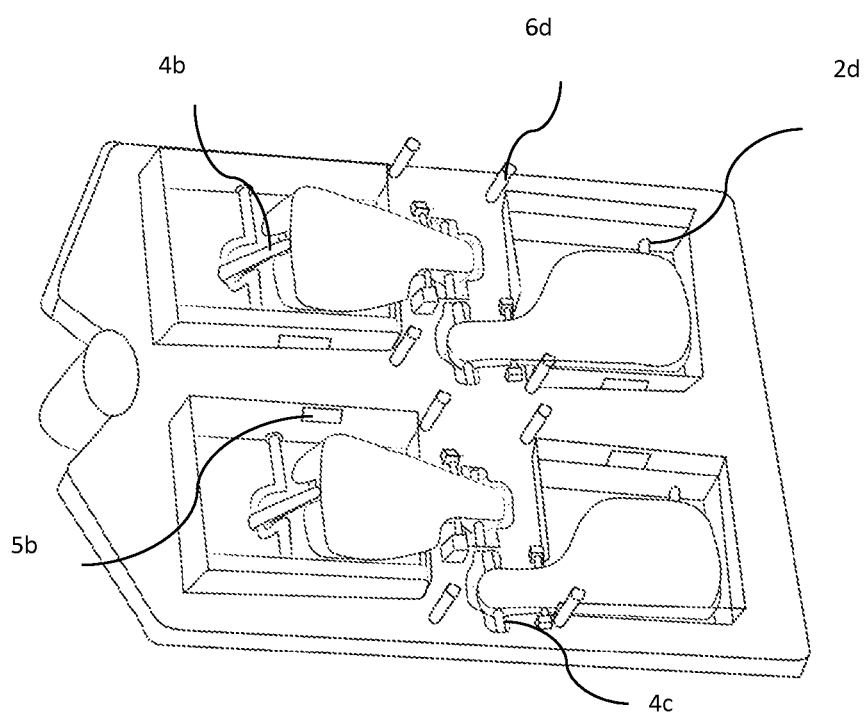
Figure: 19

Pedal four wheel foot divider arrangement
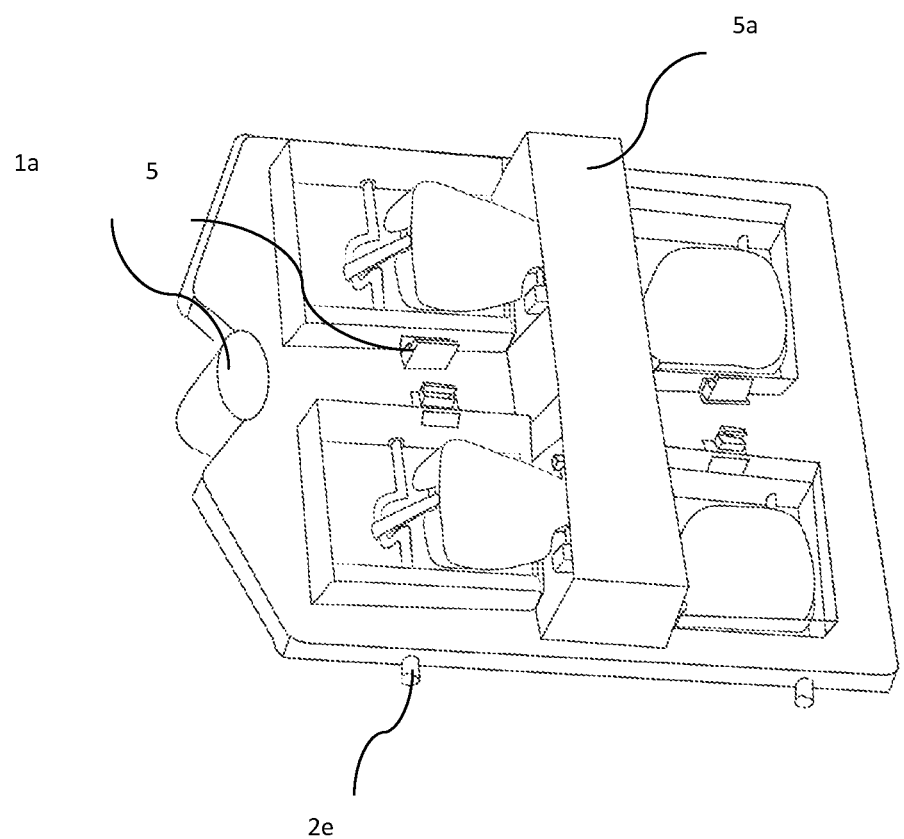
Figure: 20

Podium standing base back view
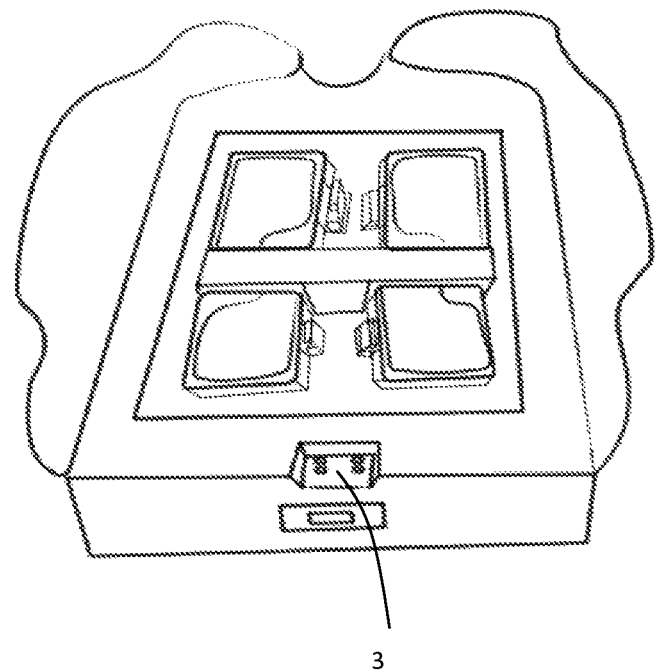
3
Figure: 21

Pedal bike without podium
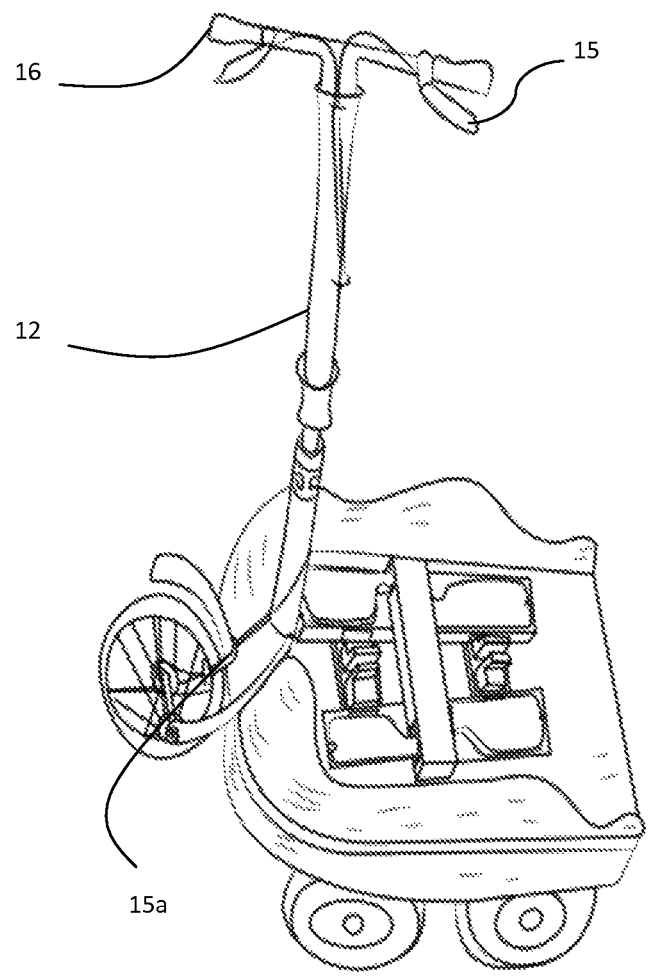
Figure: 22

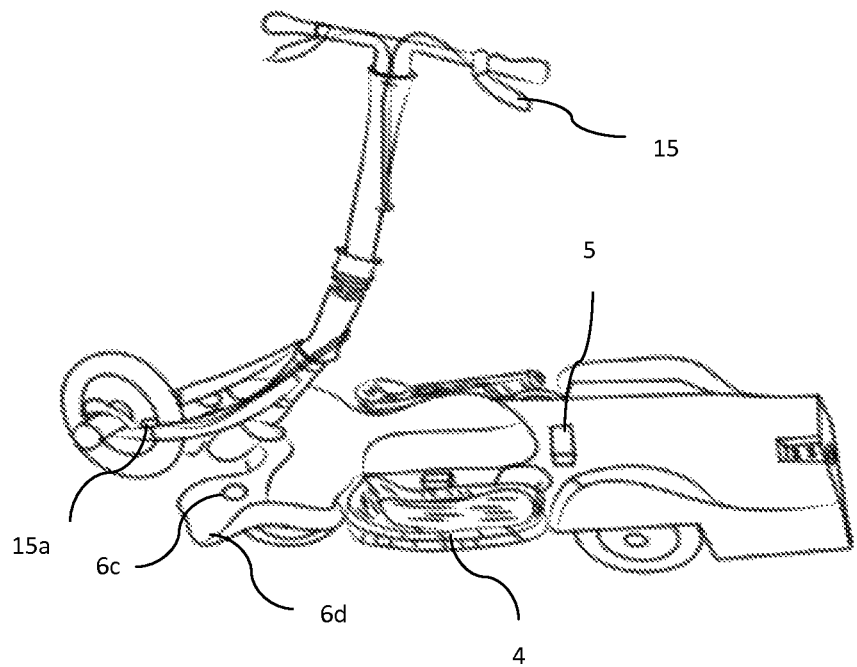
Figure: 23

Podium with five wheel chain bike
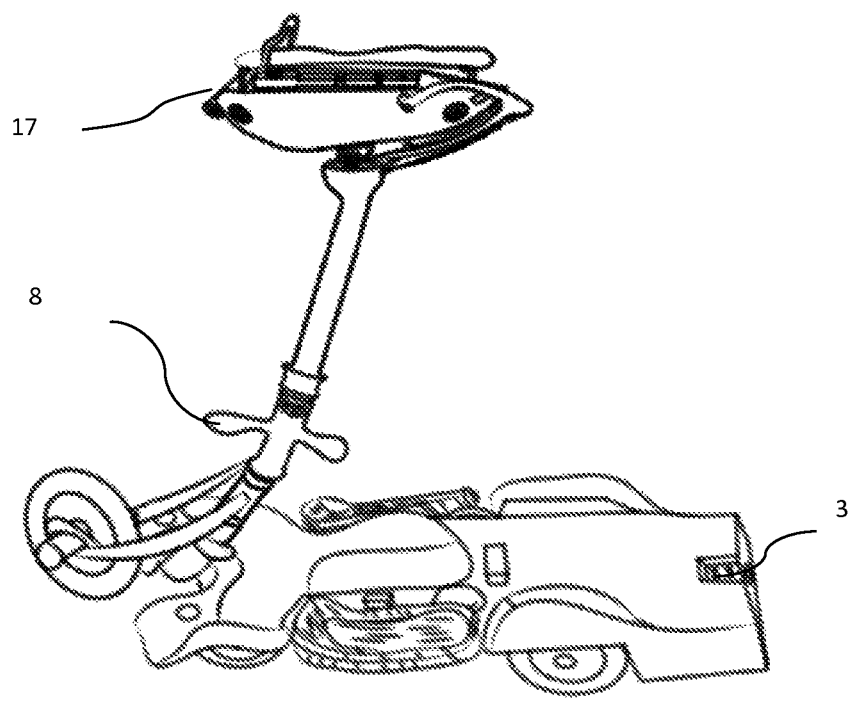
Figure: 24

Pedal bike with podium
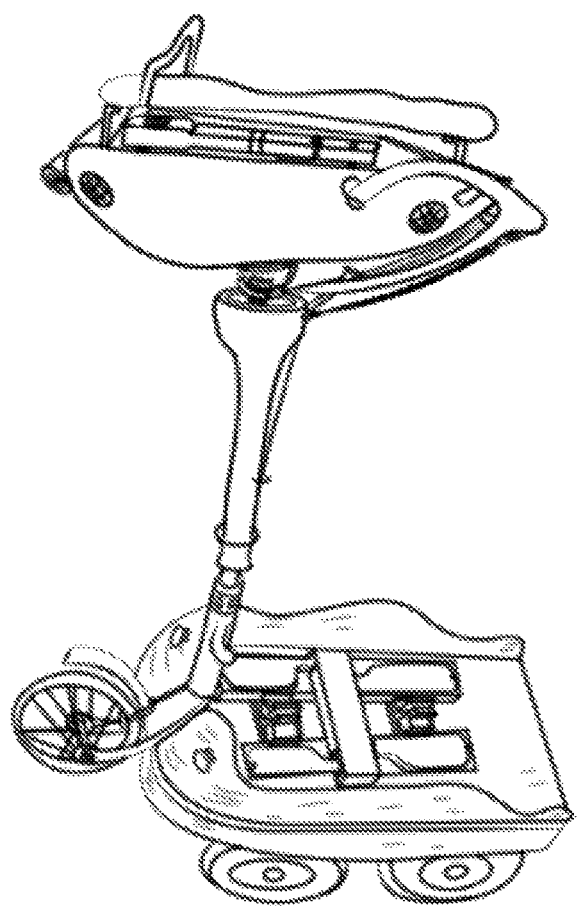
Figure: 25 writing pad and dual cam enabled with mini focusing
projector on pedal five wheels podium
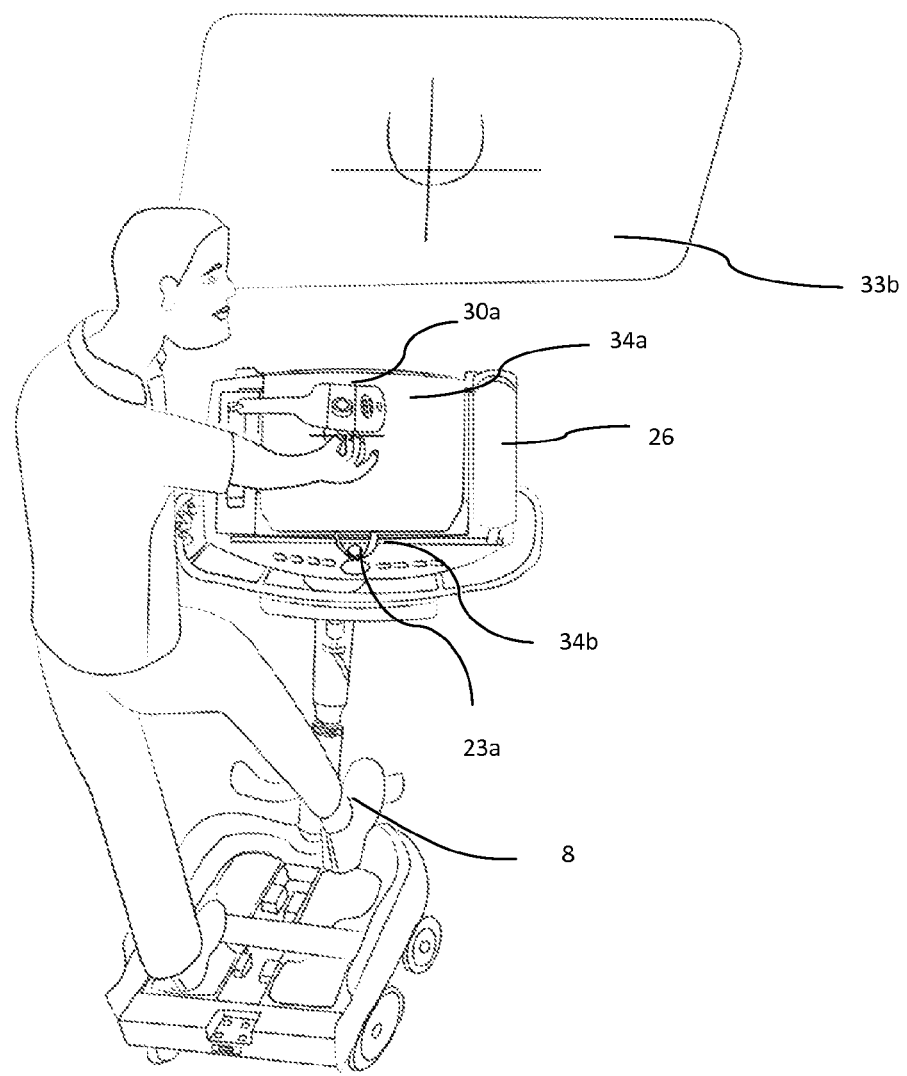
Figure: 26

Moving on chain wheel podium inside the building
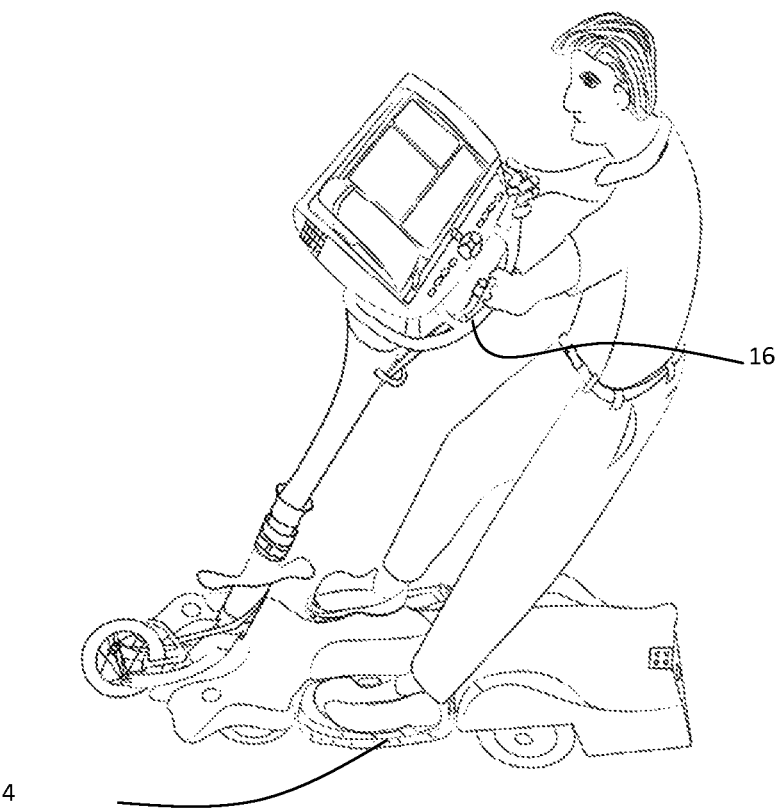
Figure: 27

Chain podium internal mechanism
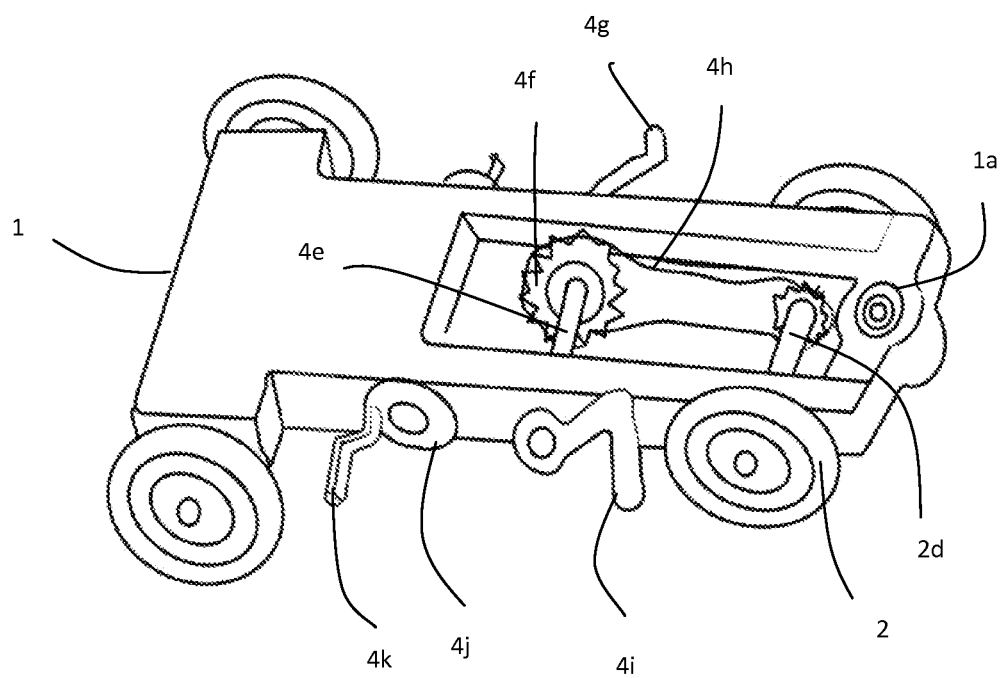
Figure: 28

Pedal mounted on the two extension rods
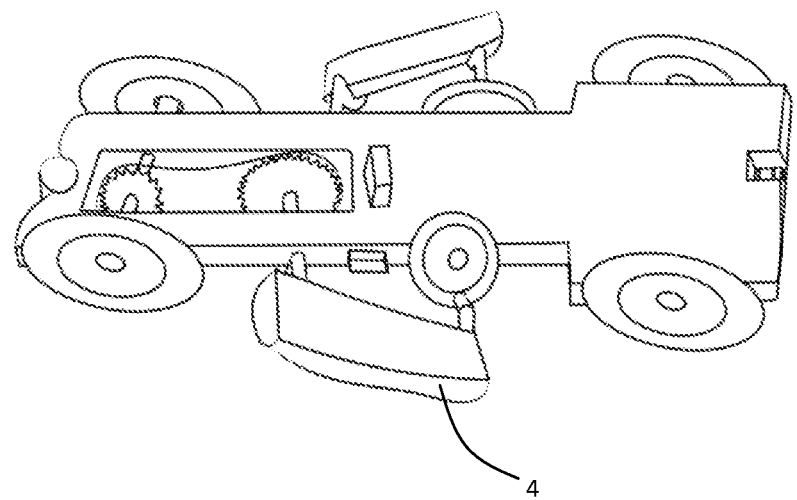
Figure: 29

Chain moving pedal comfort arrangement
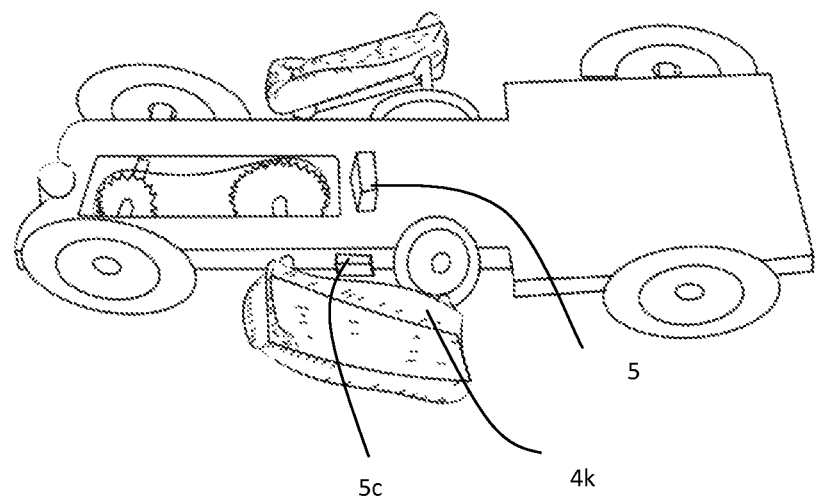
Figure: 30

Chain wheel cover hood supporting poles
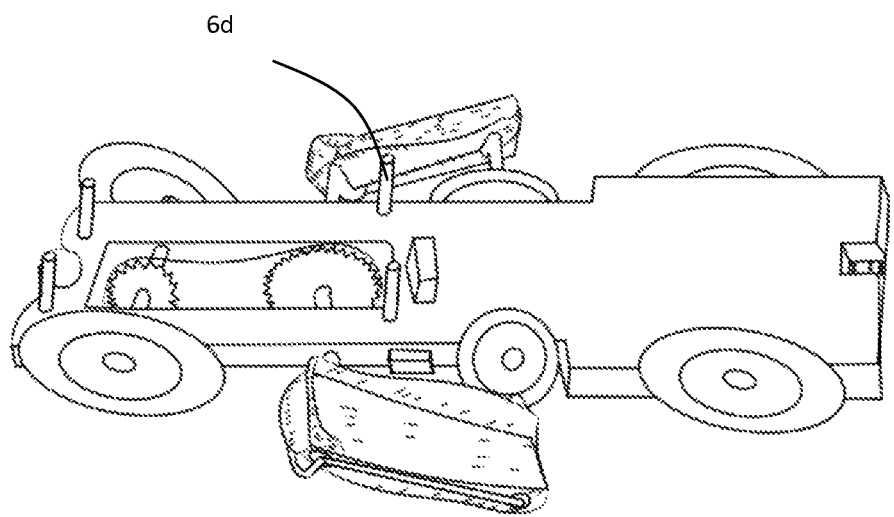
Figure: 31

Chain wheel covered with a plastic hood
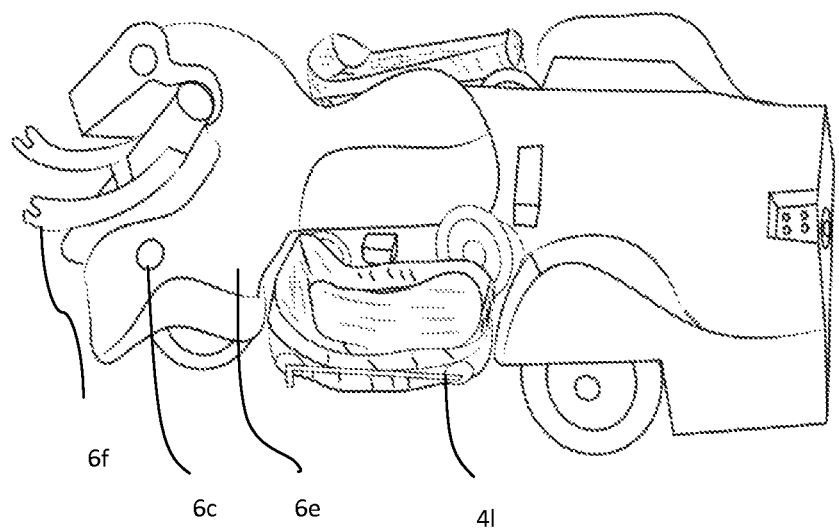
Figure: 32

Height adjustable single pole chair
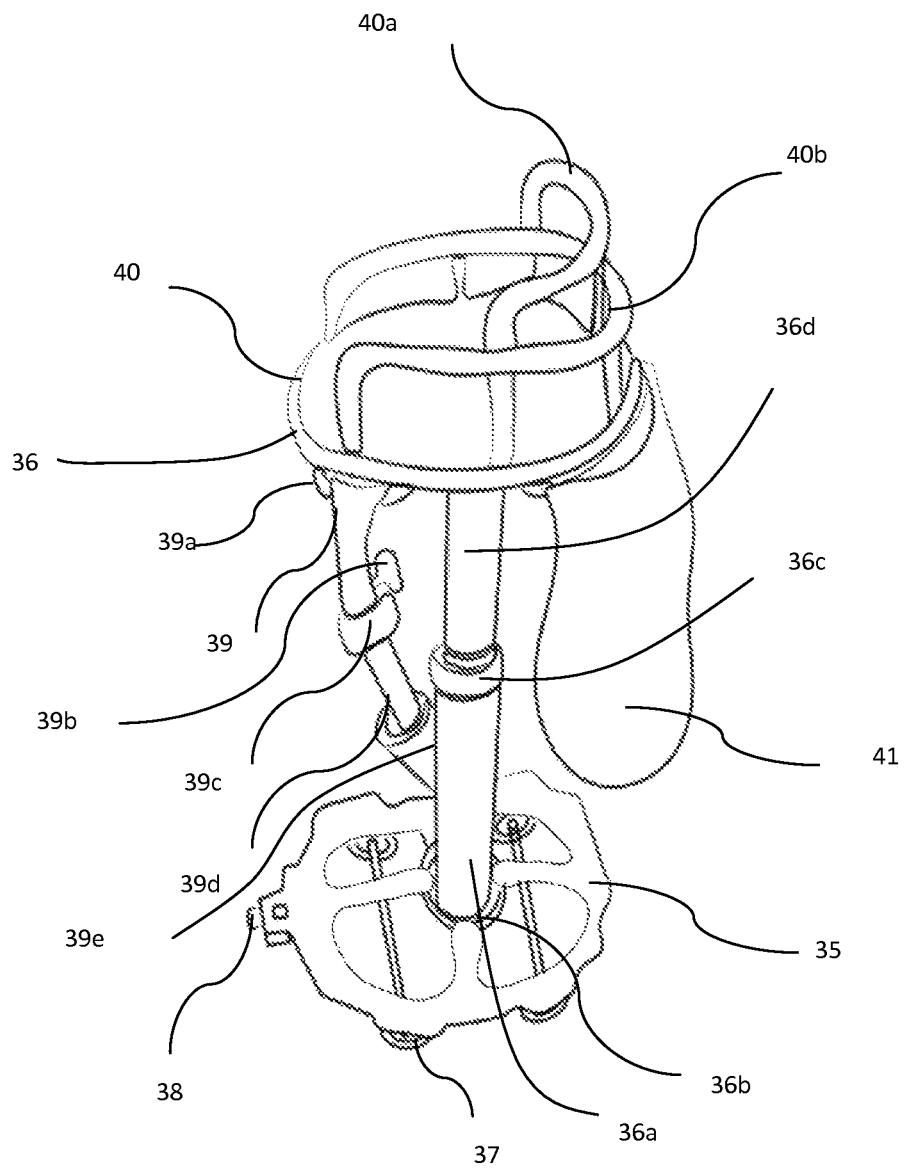
Figure: 33

Pedal podium connected to a single pole wheel chair
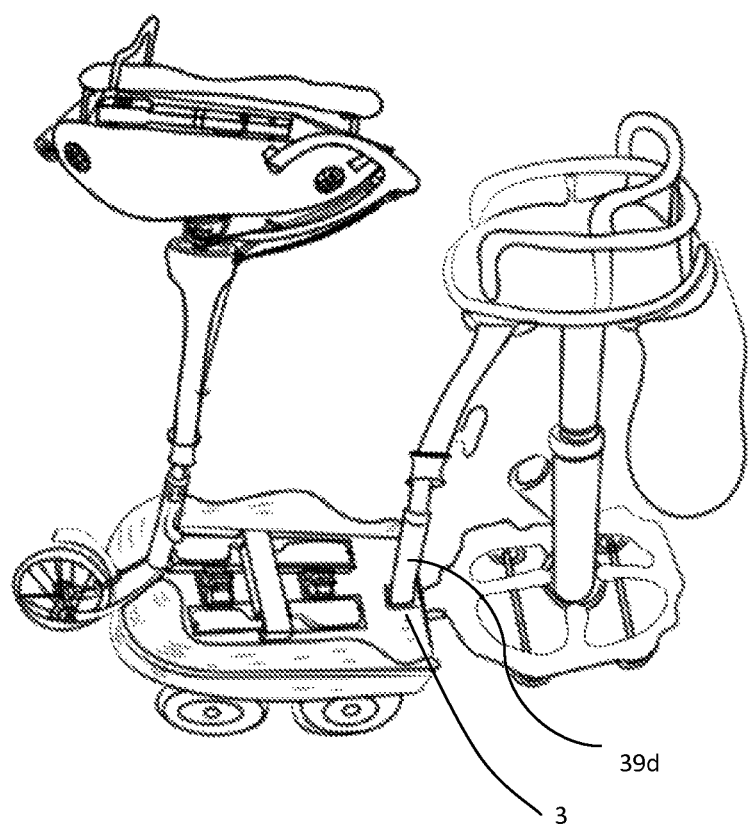
Figure: 34

Dual cam, microphone and multiple - tab system is in us by a class teacher
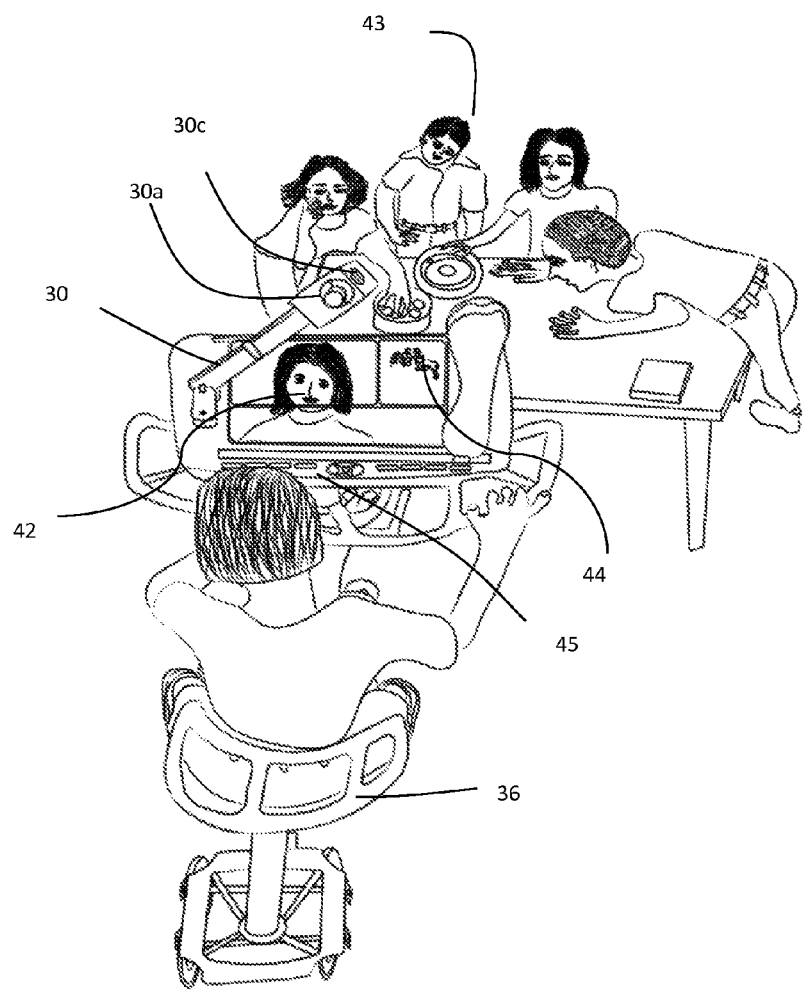
Figure: 35

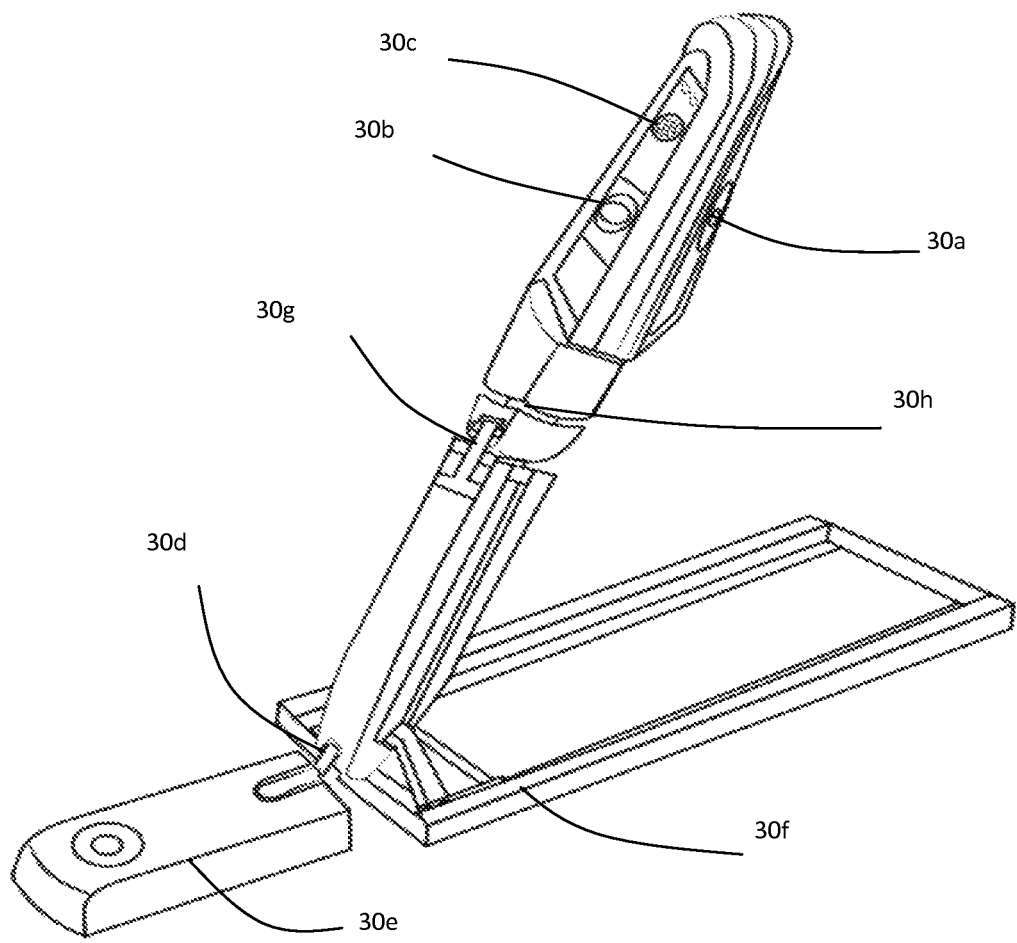
Figure: 36

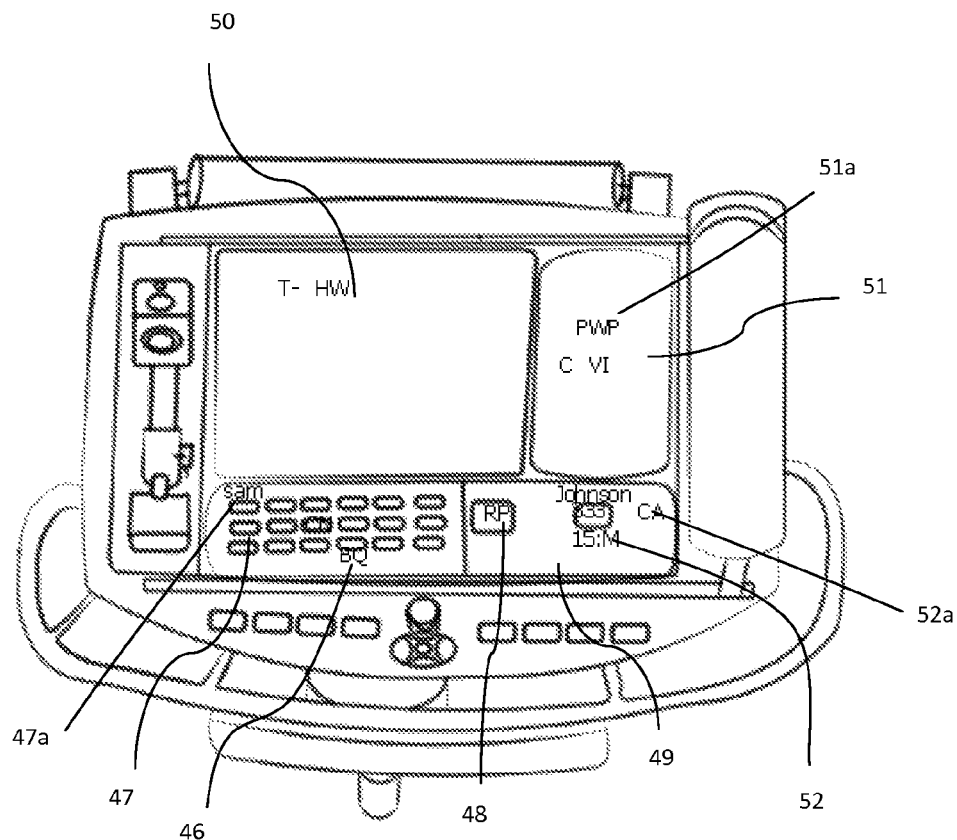
Figure: 37

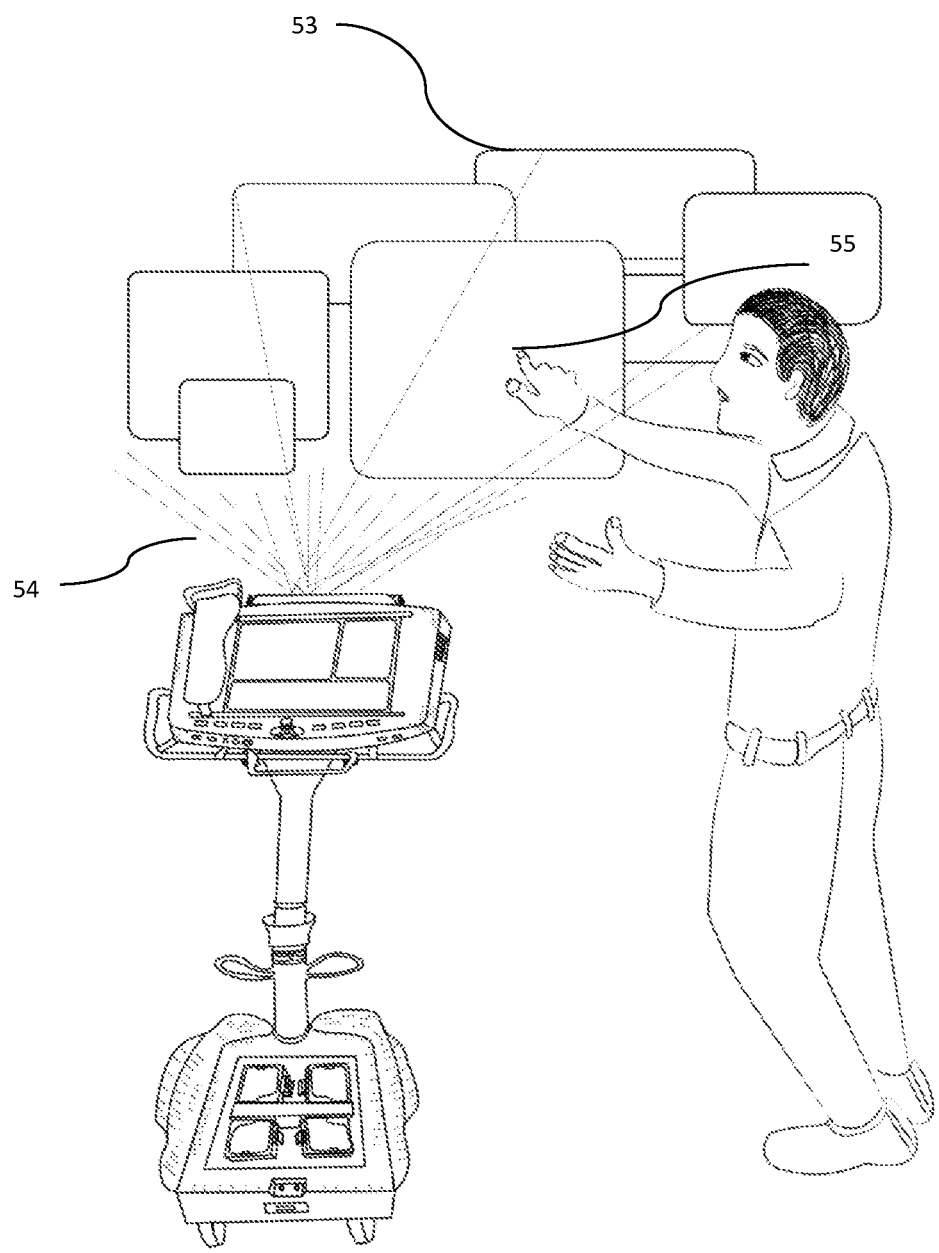
Figure: 38

Permanent digital podium
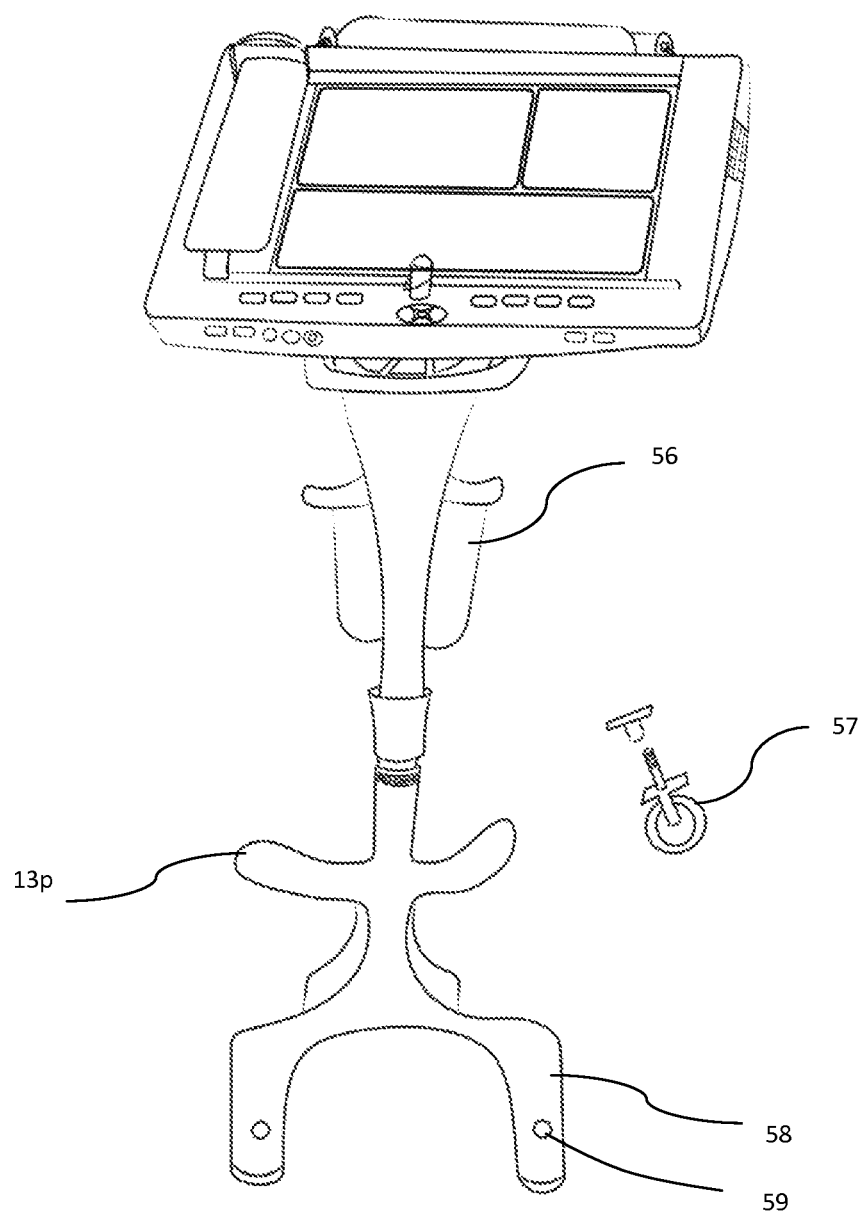
Figure: 39

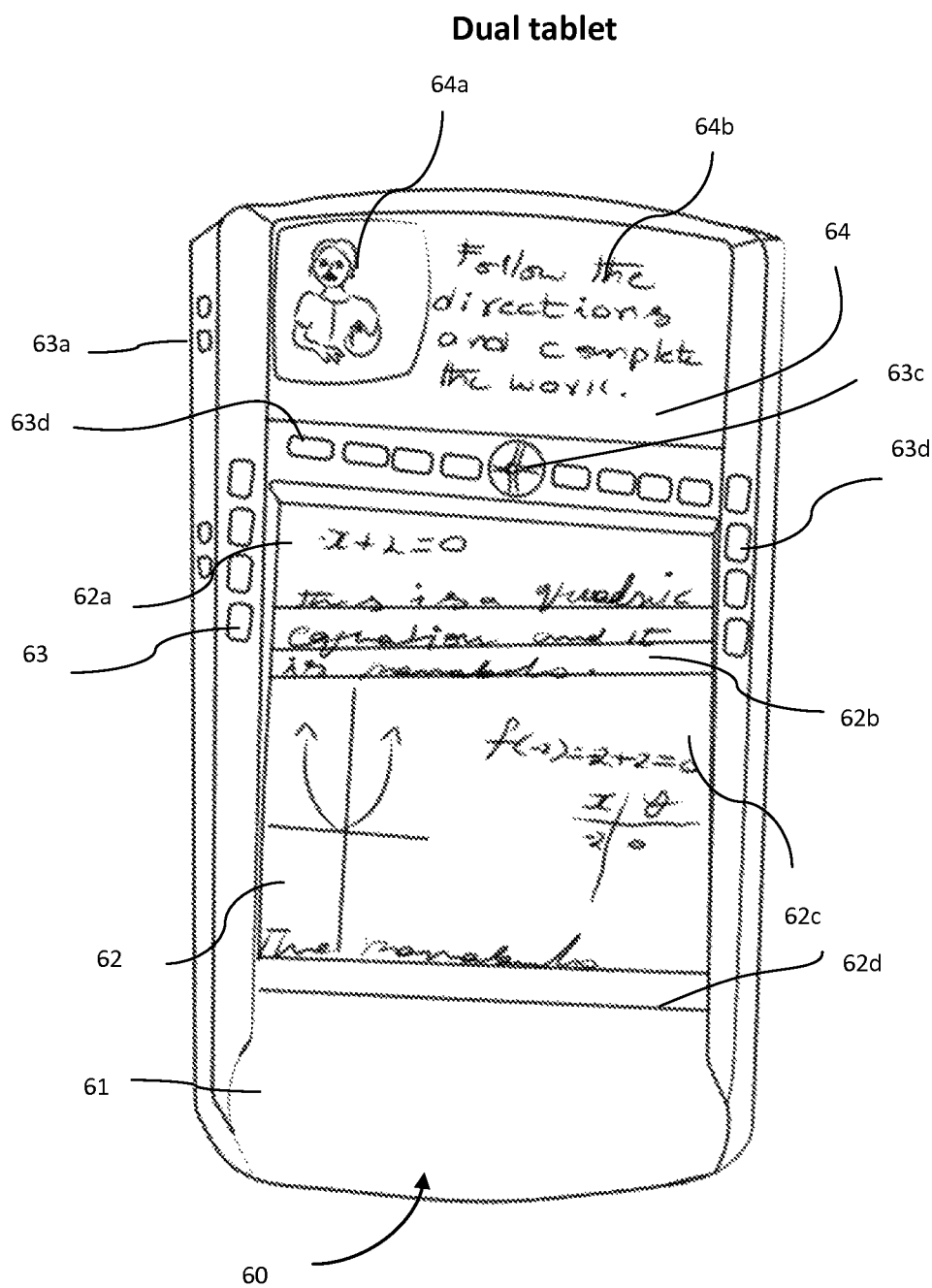
Figure: 40

A student using dual tablet in the classroom
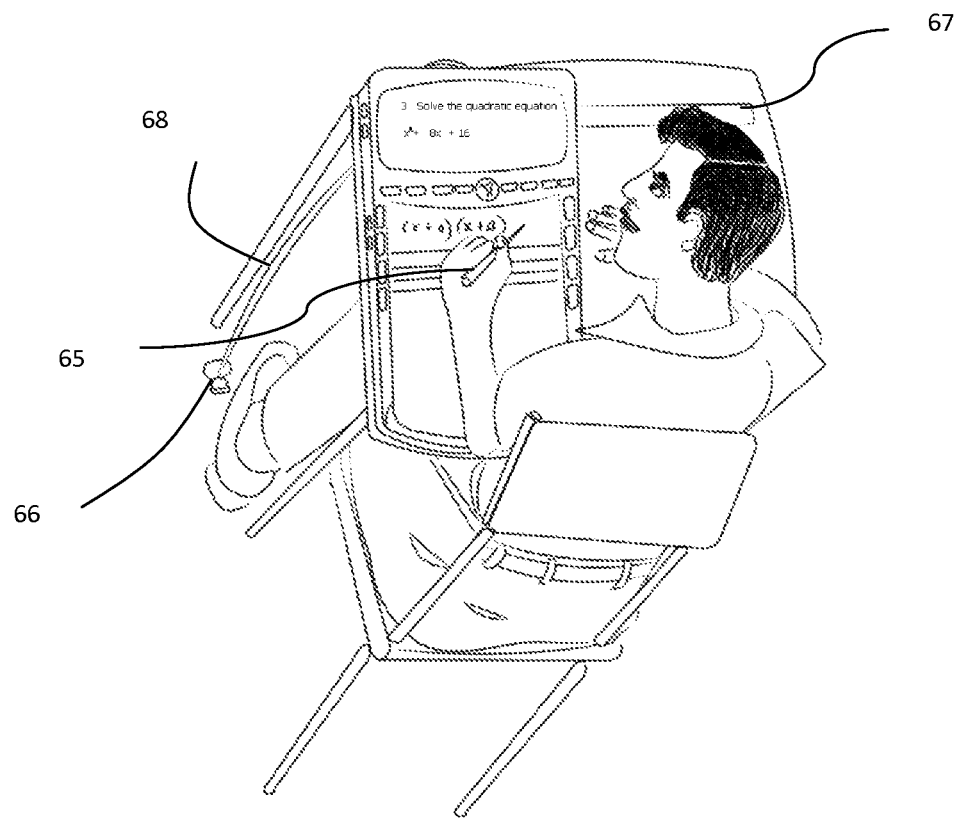
Figure: 41

Dual tablet enabled with finger print recognition for public poling
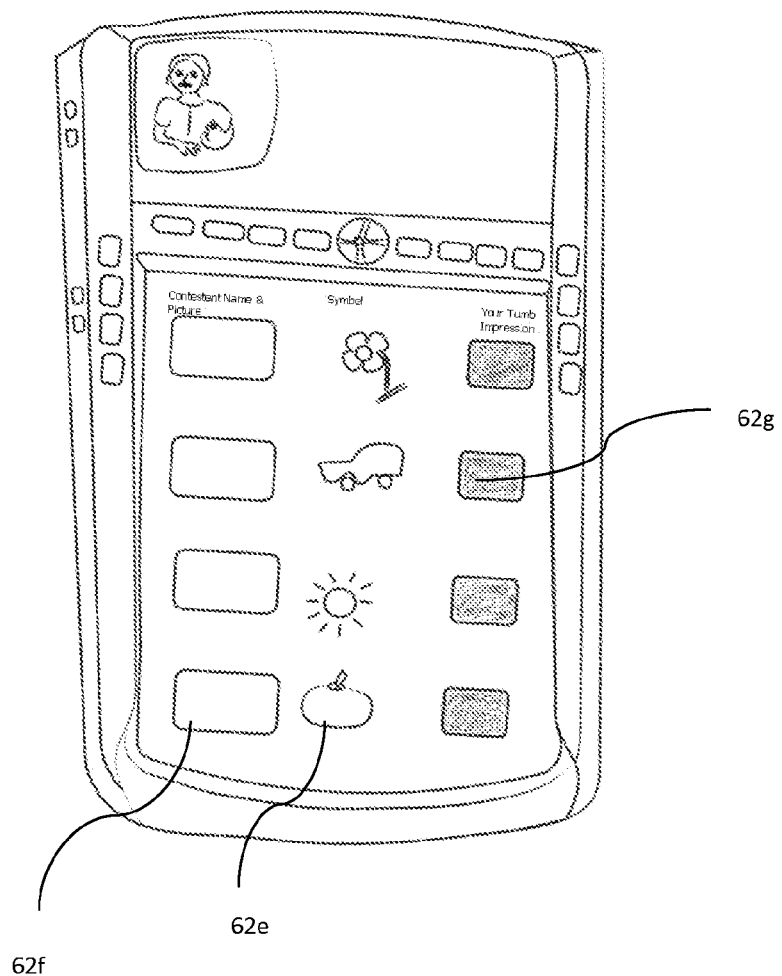
Figure: 42

Solar powered dual tablet
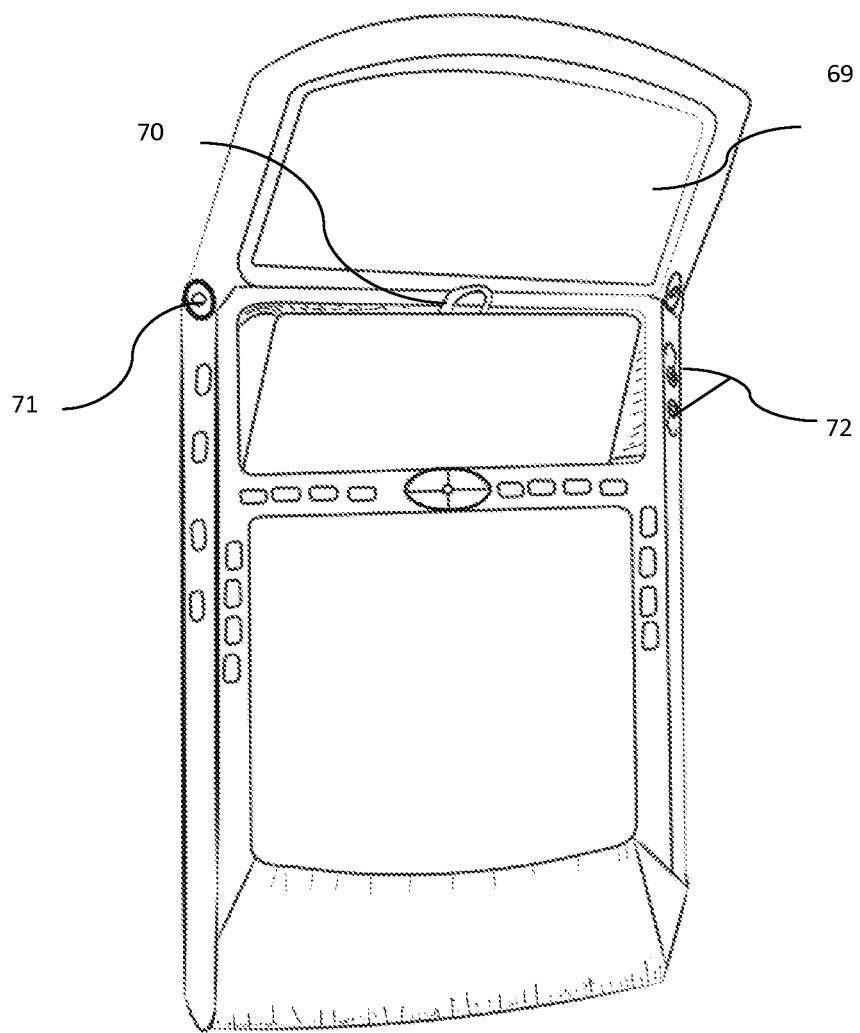
Figure: 43

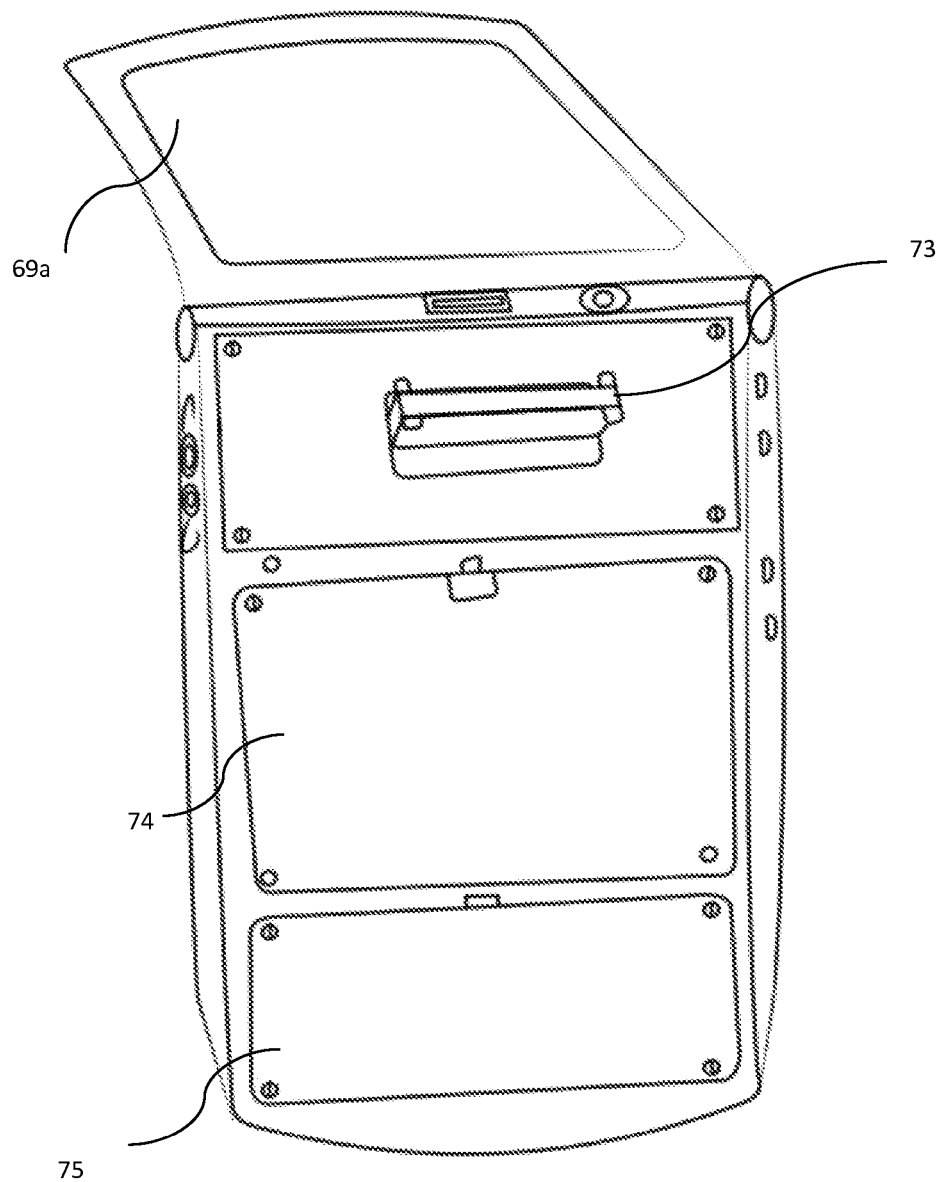
Figure: 44

Security system display on school restroom with number locked door
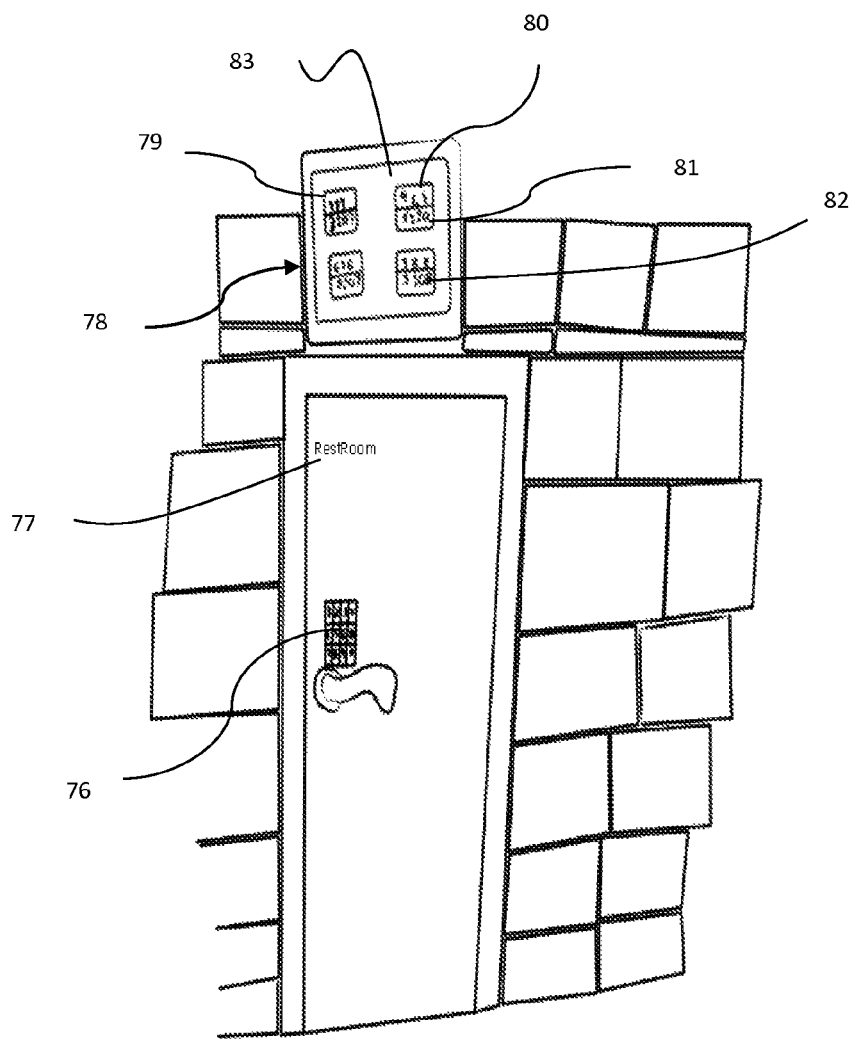
Figure: 45

Roof top Solar panel mounting frame come sunlight ventilator
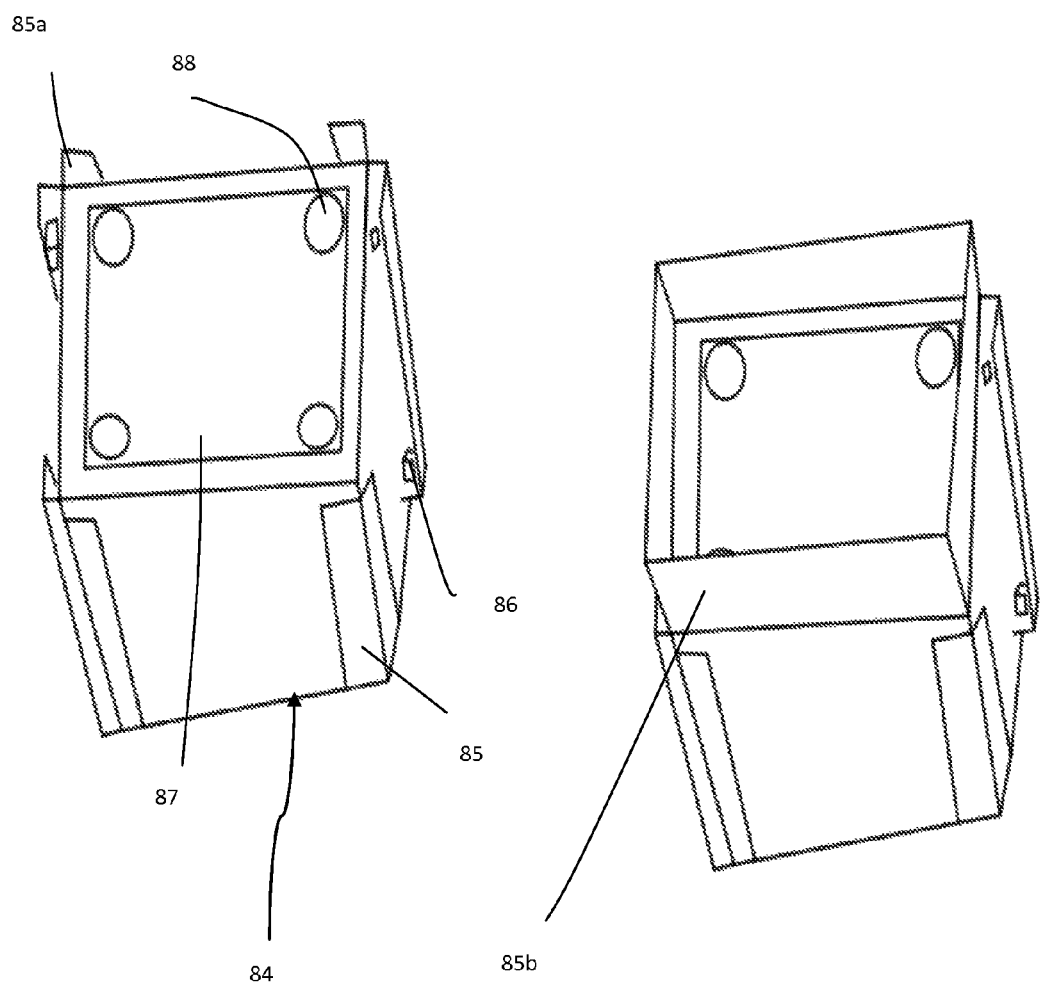
Figure: 46

Solar panel mounted on one side of frame
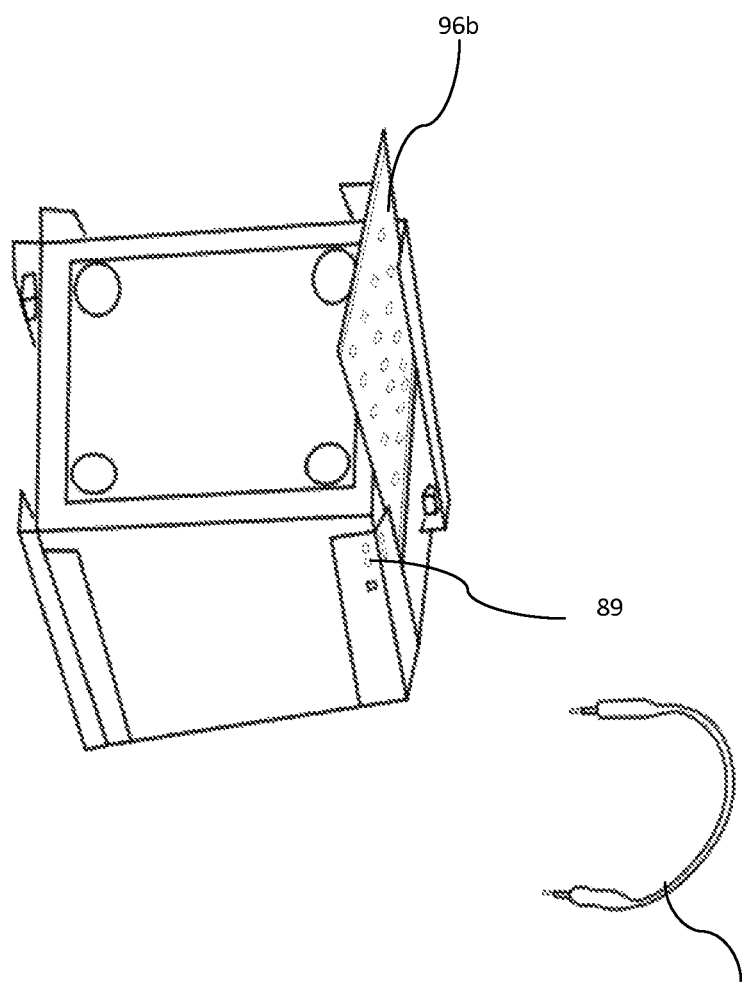
Figure: 47

Wall insert solar panel mounting frame come ventilator
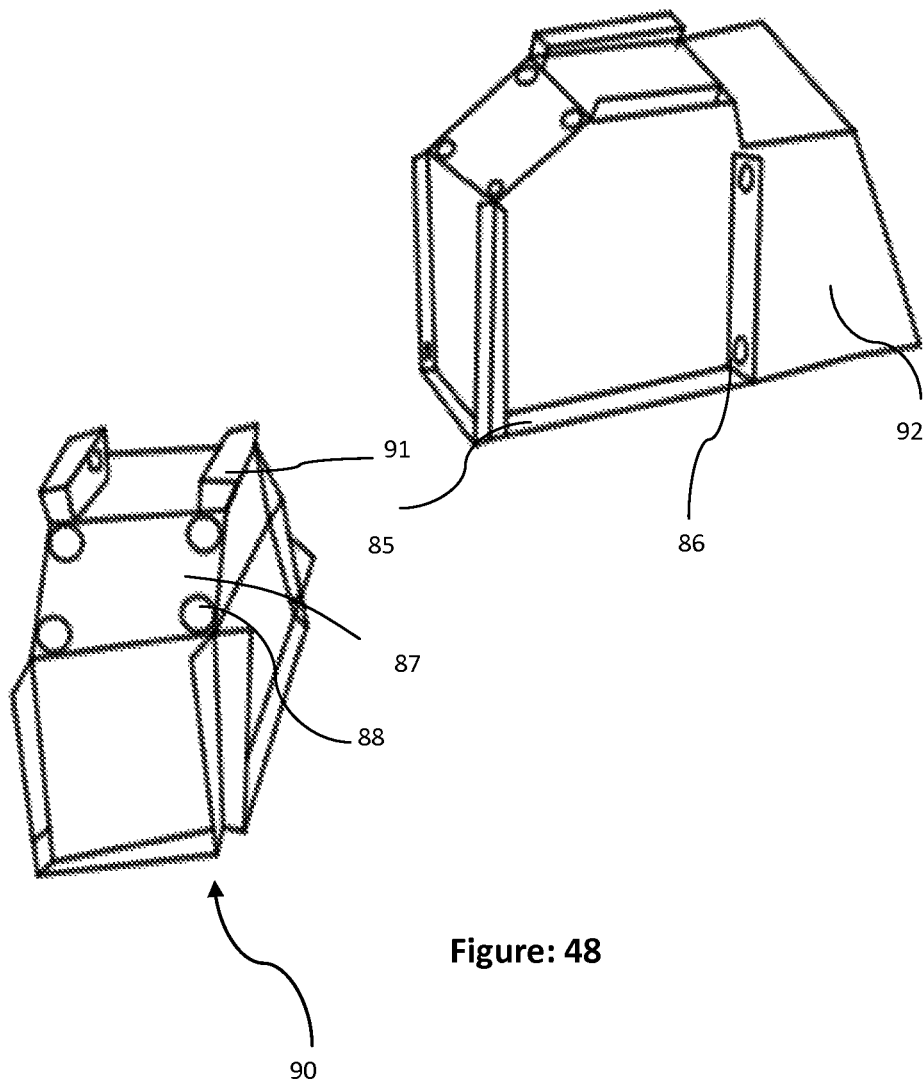
Figure: 48

Solar panel mount frame into the wall
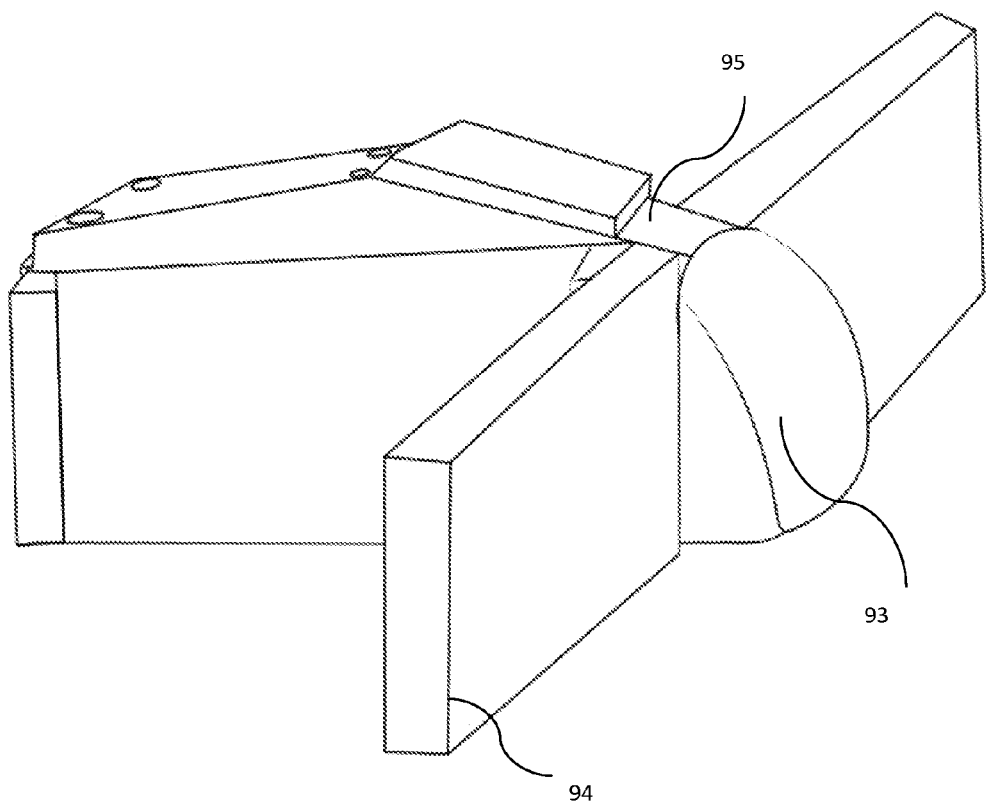
Figure: 49

Solar power storage system as well as supply method for dual tablets in the classroom
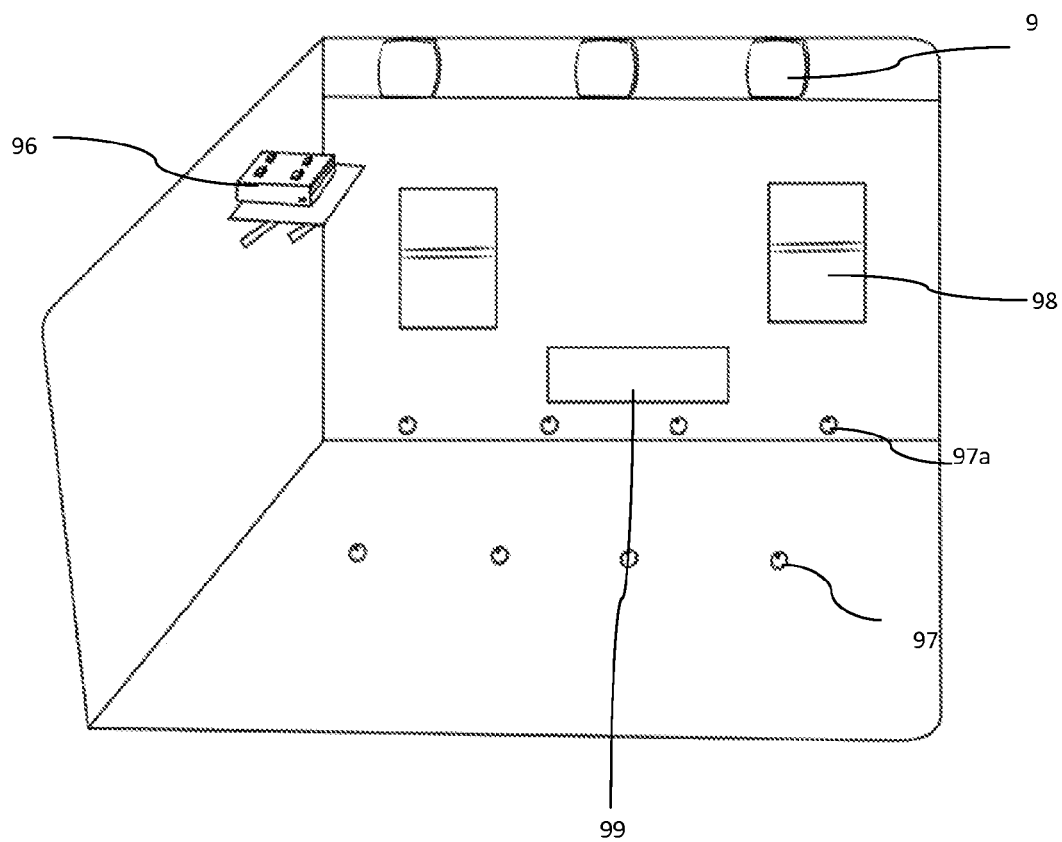
Figure: 50

A model two stair school building completely enabled with solar power by mounting frame on wall and roof to run STARCH and as well for common use.
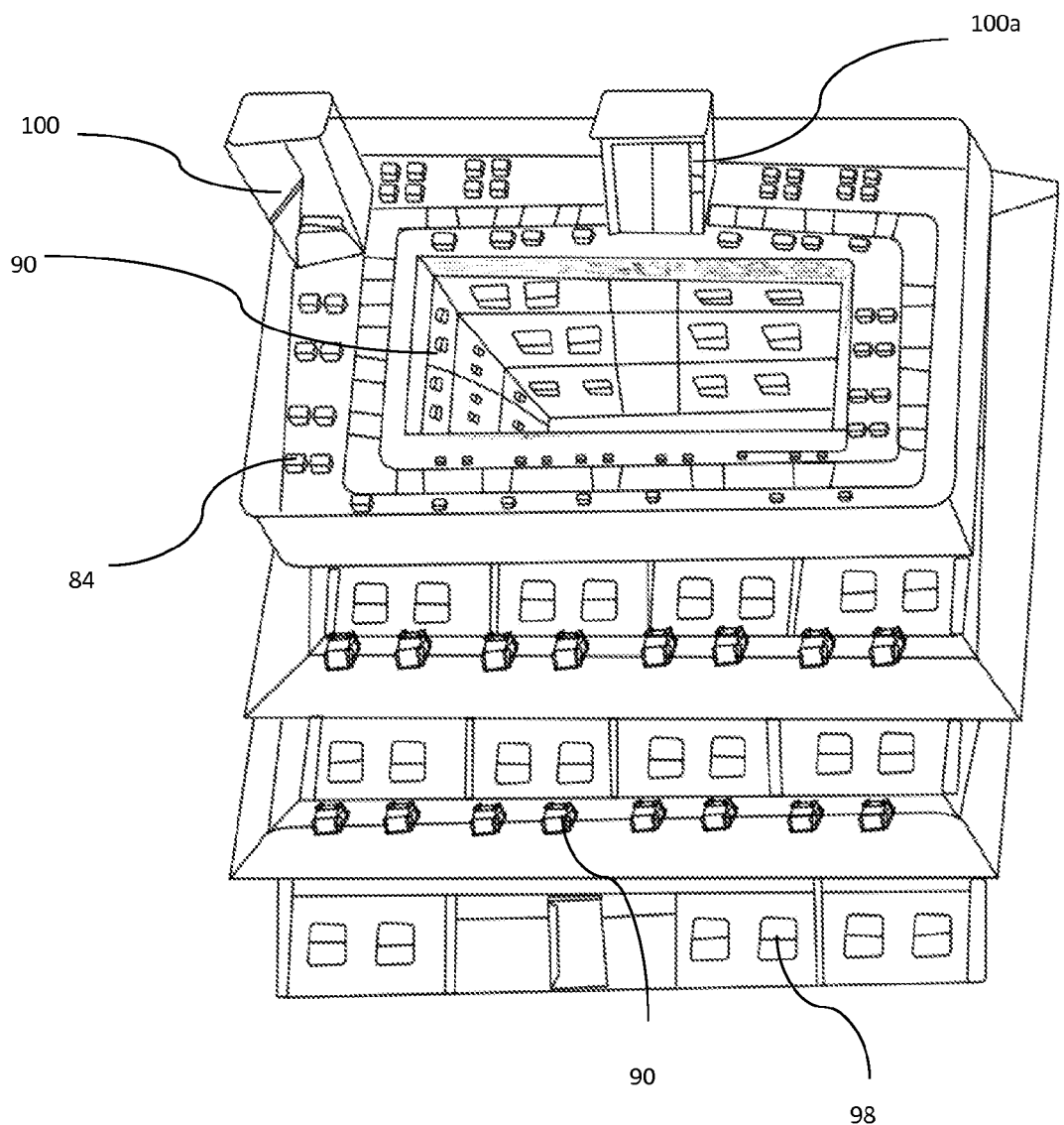
Figure: 51

STUDENT, TEACHER, ADMINISTRATIVE AND RESEARCH COORDINATING HELPER

FIELD OF THE INVENTION

The technology described herein relates generally to systems and methods for digital podiums.

BACKGROUND OF THE INVENTION

Surely Students pay attention on global warming, but there has been no history when and how the pollution emerged into our lives. Just do a quick reflection on our daily technological lifestyle; you drive a car, commute, and use electricity for entertainment and communication in schools as well as in offices. While traveling, you burn diesel, petrol, or gas, while commuting you use electricity, to store your data, you use SSD drives, flash drives or DVD but finally you submit your report on a sheet of paper. The point is, at some stage in a manner we all creating discards. One and half a century back, whatever the wastage was produced by humans and animals was mostly decomposed, or it is not an environmental polluting substance. But now due to the increased reliance on technology, presently man using most of the resources available on the land and within hundred and fifty years we used almost all the resources (nonrenewable). Now it is time to stop what we doing and find safe methods to continue the life at the same speed.

Today there is lot of technology integration into the classroom, but anyway you have to use paper along with computer because there is no proper technology integration yet. It is time to replace something with paper in the classroom to reduce pollution as well as to bring the effective technology integration into the classroom. In fact without writing and reading practice, there is no other way to improve human memory in all the content areas. The more you speak (as well as different languages), do, and participate in activities along with reading and writing, the more of problem solving capacity you will get. However, this ability differs from person to person due to their experience and practice.

Having computer knowledge is an additional skill; it is not an alternate, or substitute for paper, pen and pencil. Your hand writing coordination by using pen and pencil with your intelligence is much higher than the coordination with any other technology or computer and keyboard. For instance, the tests scores of paper and computer are always differ, even though you give those same questions as well as the same number of questions. So always you get different time duration for paper based test and computer based test administration. Most of the famous writers still use paper and pen to express their thoughts, and later they bring into the computer. However you can also master the skill with computer key board but during this process you need to go through many skill correction processes like spelling, and grammar, if you're new to that particular language, definitely it will take some more extra time too.

Schools and Universities are tried to replace computer with paper, yet they are not succeeded, so now they are keeping computers in the labs away from classroom. Computer needs different skills to operate, in the classroom from elementary to university, if you have good typing skills you can take notes and use it effectively otherwise, by the time you type a word your teacher might completed a paragraph.

We all definitely need computers but not in the classroom, they are just perfect in computer lab. All the students must continue their reading and writing practice in all the contents up to Bachelors level, because up to that level neuropsychological development will not be completed. However, form masters level also you need to practice reading and writing but it depends on the individual's chosen profession.

To have computer in the classroom for every student it is very expensive, it needs funding, and other thing is, every two to three years software companies upgrade their software, due to that many online operated text material cannot be downloaded unless until you have a compatibility software in your system. Upgrading software and hardware is great deal in this economy for public schools and as well as to the universities.

Any way the point is computer technology is separate knowledge it is not enhancing the natural skills of reading and writing (it may help in certain conditions, for Example: accommodations and modifications for exceptional). If you go beyond the nature it happens just like that. Today, most of the children in the world suffering with writing problems, either they can't write nor they can't type on the key board. This problem is not only with the children, it is up to PhD level without any discrimination.

When they get into the real jobs most of the newcomers, facing problems related to writing and typing while completing their projects. Because most of them take excess time to complete their assignments due to the lack of sufficient typing and writing skills.

Technology should enhance the natural processes, if you stop natural process it will cost you one day.

In order to contribute to solve some of the above mentioned problems, as well as an interventionist and educator, I continuing my personal research in various aspects of human life and technology, as a part of that, the present invention "Student, Teacher, Administrative and Research Coordinating Helper" (STARCH) is the one.

BRIEF SUMMARY OF THE INVENTION

The present invention is a combination of three different instruments used together in classrooms from Pre K-PhD. These instruments can solve (i) Security issues, (ii) technology integration issues, (iii) reduce the paper usage, (iv) as well as reduce the consumption of electricity used in the educational setting supplied from nonrenewable sources, by replacing the solar battery storage system. The main three inventions are: 1. Moveable Digital podium, 2. Dual tablet, and 3. solar panels mounting frame come ventilator.

1. Moveable Digital Podium:

The digital Podium can be used to teach, communicate, and record the class teaching or prepare content instruction audio video lessons and monitor the security (students outside the class, and any administrative instructions or information situation to the administrators) inside as well as outside the classroom.

(i) Pedal and chain wheel base
  (ii) height adjustable pole,
  (iii) multi tablet
  (iv) Podium Chair
  (v) security display.

Pedal and Chain Wheel Base:

Usually you just stand on the floor in front of any traditional podium, however, the present classroom teacher need to walk around the class and at the same time he/she need to teach, write on board as well as operate his/her computer. Presently most of the technology integrated classrooms has interactive boards and they can be operated with the help of wireless operated writing pad. But the big deal is discipline. Teacher must stop what he/she is doing, to respond to a student, or he need to pay all his attention to student. Once you start paying attention to a student the whole class will stop what they doing and just observe the seen. There are many issues happens around the class like; (i) one of your students out of the class and may be involved in a fight, (ii) other in restroom for more than assigned time, (iii) a visitor taken permission to observe your class, but gone else ware. Until unless the front office let you know what's happening in intercom or call you on the phone, other than that you may not know all these things. But once your class listens that in your class intercom or you on phone for some two minutes so, meanwhile you may have some distraction in the classroom. In order to deal all the above aspects one time can be possible if you move around in the classroom, continue teaching, interact with each individual student, observe your students who are out of the class, conform visitor pass after watching live video of a visitor face, provide differentiated instruction, provide modifications to those who have individual needs, and record your own teaching with your students responses or activities then you can deal discipline, and provide effective teaching. But all these can only possible if you move your computer along with the board interactive writing pad, as well as with two three cameras. But it is not possible in the classroom while teacher is walking, even though you arrange all the required things on a wheel table still it is heavy as well as you need more space. "Well it is not dream anymore"; if you stand on the base of the digital podium you can do all the above mentioned things while moving between the rows of your student chairs. The podium base will be available in two types one is puss pedal wheel and other one is chain based pedal wheel.

(a) Pedal Wheel Base:

This base supports the podium pole and it is movable when you press the pedals. These are four individual pedals are directly attached to the wheel rotating curve bar, front two pedals are used to move forward and back two wheels are used to move backwards. All the Wheels can be i locked individually when you don't want to move the podium.

(b) Chain Wheel Base:

The chain pedal also works just like pedal wheel podium but only the difference is the pedals are attached to the chain wheel and there are only two pedals.

Height Adjustable Pole:

Pole is connected to the multi-tablet frame and at the bottom it is mounted in the podium base, so according to the person's height you can adjust the height of the podium with the help of a key.

Multi Tablet Frame:

This frame works as a port for three different size tablets and one mini-projector as well as data storage, come broadcast system for dual tablets used by the students in the classroom. Further it also has inbuilt mice and dual cam arm with a supporting battery.

Podium Chair:

Chair can be used as any regular char with wheels in class room but in addition to a regular chair has a bag to store simple things like documents and any other class supplies. In addition to a regular chair this can be attached to the podium and will be able to move along with the podium when the person presses the podium pedals.

Secularity Display:

This is just a general display screen available in the market, but will be coordinated with the system to display issued passes in different locations such as; office, number of visitors, restroom, auditorium, conferences, and etc. In the displayed pass you can see a unique identification number and how much time the pass is been in the use. An administrator automatically gets the intimation to his programmed cell phone about over time passes and he can monitor during his walks in the hallway. Before issuing a visitor pass the relative teacher can confirm his/her pass by watching them from the multi-tab relayed by programmed cameras arranged at out gate along with self-issuing pass machine.

2. Dual Tablet:

This is a combination of tablet and a regular LCD screen, specially customized for classroom use, any ware in the world with the solar power as well as the regular DC-6-12 volts. This book will be made with the aim of bringing the technology into the regular classroom and enhancing the natural reading and writing process from childhood to post PhD. This tablet is enabled with Wi-Fi and all the screens run with programming but this is little bit different. The LCD screen is only capable of playing the teacher relayed audio video (because it uses different format) instructions, or any presentations. Student can store his favorite lessons or pending work lessons, and as well as every day teacher's classroom instructions in his/her personal data space. However teacher can post assignments, notes, or individualized instructions before a week, to the students account, this will eliminate the regular teacher's extra work for the students with individual requirements of audio video recordings as well as the requirements of Learning disabled including ESOL. Furthermore, teacher can differentiate and also provide modifications according to the individual student needs.

One cannot use this dual-tab for the regular internet browsing; only this is WI-FI enabled with the teachers' broadcasted instructions and to the store their notebooks other than that one cannot enter into any network. Whereas the second part is, the writing tablet, it is only for reading and writing; one can write and save that forever in the shared system or in to the USB (2.5 or 3.5). First create as many note books you want in the system and use each note book for assigned classroom. In the same note book create rules (lines) for writing and crate graph, draw diagrams use colors and make graphs or geometric diagrams, infect one can have all these effects in one single page or where ever he/she want, regardless of the page type. Even though, student changes their class, it does not matte, he/she can log into their account from any dual tab available in the school.

The written language can be changed in to the print but in order to do that the writer should select one language prior to start writing or after writing from the available languages. The processes completely enhance natural reading and writing skills due to the eye, mind and hand coordination related to individual thinking process. But one cannot bring other software work into the dual tab. But once the written work is turned in to the print it can easily imported into typing software. However, this tablet is only for hand written works but when you convert your handwriting into the print or as tease copy that into your own flash drive, later you can open that in any computer. But this hand written work is always available in the school data base for the school records. This dual tablet will eliminate all the bad browsing problems we have in the class room the display screen is under control of teacher, only student can forward or review, or can store in his school personal space as well as into his personal flash drive. Teacher can prepare for the everyday teaching effectively with the help of audio video recording options as well as can provide modifications without any commitment. The wireless speakers attached to the individual system will completely eliminate the noise problems, now each child can have his instruction in the same content standard, element at his present level accordingly as well as there is not much skills required to operate the system. Teacher can monitor each student in the classroom and communicate with each student individually, warn them, about his/her behavior, teacher can also post his/her expectation to a particular student, and can issue hall pass, rest room pass (a number that student has to remember and use it to open the bathroom door, once the number is issued to a student it will be displayed on the particular restroom's display board with the issued time) for each purpose in the campus including the colleges (at university level) so the administrator finds any student in the hallway he/she can just need the pass number, once he enters the number in the app enabled cell phone he will find all the information about that student.

Each dual tablet book runs with the 12 volt DC power or it has an inbuilt solar sensor, it also converts the light energy into electrical power, so the solar energy can directly store into the tablet battery for emergency backup use.

4. Solar Panel Mounting Frame Come Ventilator:
 (i) Roof top
 (ii) wall insert
 (iii) battery system Till date the style in solar system is to arrange the solar panels in one direction and later use the tracking system (with the help of actuators but to run tracking motor also you wasting power) to find the sunlight. However the present invention will differently solve the tracking problem by using the panels in all directions instead of using the tracking system.

Roof Top Solar Panel Mounting Frame:

On four sides of this frame you can mount four solar panels; on the top it has a transparent glass to send the sunlight directly into the classroom. There are four pipe structures under the transparent glass to mount four light sensitive bulbs, these bulbs will automatically on when sunlight is off inside the classroom, so there is no need to use regular electricity to run the lights.

Wall Insert Solar Panel Mounting Frame:

This solar panel mounting frame also has same features but this is designed to insert inside the side walls.

Table 1: Elements with Drawing Figures

FIG. 1:
60. Dual tablet in use by a student at left side
67. Tablet sliding rail attached to student desk
102. Permanent display projector in the school
102a A permanent display board
1. Base
FIG. 2:
1. Wheel podium beam cover
2. Wheels
3. Wheel chair lock-(i)
4. Pedal
5. Lock
6. Podium top cover
7. Podium pole
8. Foot rest
9. Podium pole height adjusting keys
10. Pole threads cover
11. Internal threaded pole
12. Multi-tablet frame connecting pole
13. Cone shape multi-tablet connecting baring arrangement structure
14. Audio video in and out
16. Handle
17. Multi-tab Frame
18. Air flowing way
19. USB in
20. USB in
21. Operating keys
22. Four way key
23. Writing pad hook connecting pole
24. Arm rest rail for movement
25. Arm rest supporting bracket
26. Arm rest
27. Hand grip
28. Writing pad
29. tablet-1
29a. tablet-2
29b. tablet-3
30. Dual cam and microphone arm
FIG. 3
30. Dual cam and microphone arm
30a. video cam-1
35. Audio speakers
13a. Multi-tab tilting u-clamp mounts
13b. Multi-tab frame tilting lock
13c. Ball bearing arrangement for handle movement
13d. Front break connecting wire
13e. Handle clamp support
13e. Wire holding hook
FIG. 4
29b. Tablet-3
30g. Arm rest clamp mounting thread
24. Arm rest rail
31a. Tablet power and data transfer inserts
31b tablet power and data transfer inserts
32. Layer-3
FIG. 5
29, a, b. Tablet 1, 2, & 3
30. Dual cam and micro phone arm
33. Tablet movement and mounting rails
FIG. 6
17. Multi-tab frame
23. Writing pad hook (34b) connecting pole
23a. Writing pad hook pulling ring
34. Writing pad rotating rod
34a. Writing pad reliable sheet.
34b. Writing pad hook
FIG. 7
15. Front wheel brake handle
15a. Front wheel brake
16. Handle
16a. Handle stabilizing clamps
16c. "u" clamp mount
17. Multi-tab frame
18. Air ventilation (fan)
19, 19a. USB connection
19b. audio video in and out ports
19c. extra audio video cable in and out
19d. power and charging in
35. Audio speaker
FIG. 8
36. Layer-1 for lithium battery
36a. Layer-2 for circuit board
36b. Layer-3 for multi-tab mounting rails
36c. power and data transfer connections
FIG. 9
Layer-1
33. Length and width adjustable phone/mini projector mount
FIG. 10
13g "u" clamp mounting space
13a. side of the bracket
13h. Ball Barings for "u" clamp smooth movement
FIG. 11
13i. thread pipe to mount in the podium pole FIG. 12
9. Pole height adjusting keys
10. Cover for extending bar
11. Podium pole extendable internal bar
11a. ball baring crew extinction to rotate
12. Podium pole lower part
13. Podium pole upper part of (baring part)
13c. handle rotating ball Bearings
13e. Handle support hook
13k. Cable hook-1
13j. thread pipe to fit in ball bring podium pole
13i. Crew mounts for Handle stabilizer (16a)
13k. Cable hook-2
13l. Ball crew rail attachment mounts for internal bar (11)
FIG. 13
16d. "U" clamp to mount under the multi-tab frame at (16c)
16e. "u" clamp mount
16f. mounting bracket
16g. thread hole to combine clamp and bracket
FIG. 14
2. Wheel
2a. wheel and tire supporting bars
2b. wheel pole mounting bar
15a. Front wheel brake
6a. speaker
6b. light
5. Wheel lock
5a. food rest
4. Pedal
3a. wheel chair locks system
FIG. 15
13d. Front brake connecting wire
13e. handle support
13f. Brake wire hook
15. Front wheel brake handle
15a. Front wheel brake
16 handle
FIG. 16
1 Custom punched 1.5 inch iron beam
1c. square space to mount pedal
FIG. 17
1. Podium base
1a. podium pole mounting hole
1b. space for pedal
2c wheel rotating rod
2b. wheel rotate "u" curve
FIG. 18
4a. Pedal mounting pipe clamp
FIG. 19
4b. pedal pipe "connecting two side hook
4c. pedal extinction clamp
5b. pedal lock space
6d. foot rest mounting supporting poles
FIG. 20
1a. Podium pole mounting hole
5. Pedal lock
2e. wheel rotating pole
5a. foot rest
FIG. 21
3. Wheel chair bar (39d) lock
FIG. 22
15. Front wheel brake handle
15a. Front wheel brake
16. Handle
FIG. 23
15. Front wheel brake handle
5. Pedal lock
4. Pedal
6d. hood
6c. light and horn
15a. Front wheel brake
FIG. 24
8. Foot rest
3. Locks
FIG. 25
Pedal podium with multi-tab
FIG. 26
8. Foot rest
23a. writing pad hook
34b. arm rest support moving rail
26. Arm rest
34a writing pad
30a dual cam and micro phone
33b. mini projector focused on screen
FIG. 27
4. Pedal is connected to Cain wheel (4f—FIG. 28)
16. Handle
FIG. 28
1. Base
1a. Podium pole mounting hole
2d. front wheel rotating rod
4e. axle rotating road
4f. chain axle wheel
4g. chain axle rotating pedal
4h. chain
4i. pedal mount
4j. extra support wheel
4k. pedal support wheel extinction
FIG. 29
4. Pedal (made by combining axle wheel extension and extra support wheel extension)
FIG. 30
4k foot support on pedal
5. Pedal lock
5c. Pedal lock out
FIG. 31
6d. hood supporting poles
FIG. 32
4l. extra support clamp to pedal
6c. light and horn
6e. hood
6f. front wheel mounting poles
FIG. 33
35. Chair wheel and cylinder support frame
36. Custom made actuator
36a. iron ring
36b. actuator height adjustment key
36c. Iron pipe
37. Wheels
38. Lock insert
39. Extendable lock arm
39a. lock arm clamp
39b. arm extinction key lock
39c. arm extinction key
39d. Lock key
39e. extinction arm insert
40. Sitting space
40a. extended back rest
40b. back rest
41. Teacher bag
FIG. 34
39d. arm extinction is locked inside the lock (3)
3. Lock FIG. 35:
30. Dual cam and microphone arm
42. Video out of cam-(30a) is enabled in multi tab 29, and 29b
43. Recording subject
44. Video out of cam-2 (30b) video out sent to tab-29
45. Real time editing key board and operating keys
FIG. 36
30a. cam-1
30b—cam-2
30c. Micro phone
30d. base Pipe clamp
30e. support base
30f. Micro rail
30g tilt-2-clamp
30h. rotation clamp
FIG. 37
46. Teacher sent Be Quit request to a student
47. Students are shown as boxes in rows
47a. Student (Sam) is trying to communicate with teacher
48. A student sent request for pass
49. Tablet (29b) screen is divided into two parts
50. Teacher Hand Writing
51. Second tablet is assigned for previewing the work before sending to student or watch ongoing recordings.
51a. Power point preview
52. Student pass number as well as time of he/she been out from class for 15 minutes.
52a. Contact administrator
FIG. 38
53. Laser projector display and touch enabled
54. Laser ray
55. Touch the places where the touch is enabled
FIG. 39
1p. foot rest
56. Program poster display board.
57. Wheel to be fixed in the tread hole (59)
58. Permanent Stand
59. Treaded hole for wheels
FIG. 40
60. Dual tablet book
61. Pam rest (while writing)
62. Hand writing enabled visible screen
62a. free writing area without rules
62b. Rules are enabled when required
62c. second white space as well graph area
62d. Rules are enabled again when required
63. Operating keys
63a. USB for record input in the scree two (64)
63b. input display from multitasks (29, a, & b)
63c. four way key to manage the input display in screen two (64)
63d. left side operating keys
64. Screen two
FIG. 41
65. Writing stick using from left side
66. Power supply
67. Dual tab sliding rail to adjust for right and left handed writing
68. Power card connected to dual tab
FIG. 42
62e. symbol of contestant
62f. contestant Id
62g. Thumb impression recognizer enabled space
FIG. 43
69. Micro solar panel
70. Screen tilting hook
71. Two side micro solar panel rotating key
72. Wireless ear phones
FIG. 44
69a. Side two micro solar panel
73. Sliding rail insert clamp
74. Circuit board opening cover
75. Battery opening cover
FIG. 45
76. Number locked door
77. Rest room
78. Wireless screen display
79. Student pass
80. Student identifying pass number
81. Time of pass issued
82. Over time pass
83. Total number of person in the rest room
FIG. 46
84. Multi-solar panel mount frame-come roof top ventilator
85. Supply attachment to solar panel (+/−)
85a. supply attachment in other side frame
86. Solar panel mount
86a. Solar panel mount
87. Mirror
88. self-sensor individual solar light
FIG. 47
89. Series and parallel patron arrangement quarter inch cable in (+/−)
99a. two sided pin cable
FIG. 48
85. Supply attachment to solar panel
86. Solar panel mount
87. Mirror
88. Self-sensor individual solar light
90. Wall mount solar panel frame-come ventilator
91. Solar panel mount frame
FIG. 49
93. Carved glass ventilation
94. Wall
95. Frame extinction to sit inside the wall
FIG. 50
9. Wall sun ventilator glass
96. Storage battery
97. Power supply on floor
97a. power supply on wall
99. Individual room AC
FIG. 51
84. Roof top solar panel mount frame
90. Wall solar panel mount frame
98. Air title transparent window
100. Walking upstairs entry into tares
100a. lift entry into the tares

BRIEF DESCRIPTION OF THE DRAWINGS

The technology described herein is illustrated with reference to the various drawings, in which like reference numbers denote like device components and/or method steps, respectively, and in which:

FIG. 1 is a perspective diagram illustrating a dual tablet in use by a student, a tablet sliding rail attached to a student desk, a permanent display projector in the school, a permanent display board, and a base, according to an embodiment of the technology described herein;

FIG. 2 is a perspective diagram illustrating a digital podium, according to an embodiment of the technology described herein;

FIG. 3 is a perspective diagram illustrating digital podium side view;

FIG. 4 is a perspective diagram illustrating a tablet, according to an embodiment of the technology described herein;

FIG. 5 is a perspective diagram illustrating a multi-tablet configuration, according to an embodiment of the technology described herein;

FIG. 6 is a perspective diagram illustrating a multi-tablet configuration, according to an embodiment of the technology described herein;

FIG. 7 is a perspective diagram illustrating a bottom view of a multi-tablet configuration, according to an embodiment of the technology described herein;

FIG. 8 is a perspective diagram illustrating an internal view of a multi-tablet configuration, according to an embodiment of the technology described herein;

FIG. 9 is a perspective diagram illustrating an internal layer and mini laser projector of the multi-tablet, according to an embodiment of the technology described herein;

FIG. 10 is a perspective diagram illustrating a ball bearing clamp for use with the multi-tab frame, according to an embodiment of the technology described herein;

FIG. 11 is a perspective diagram illustrating a ball bearing clamp for use with the multi-tab frame, according to an embodiment of the technology described herein;

FIG. 12 is a perspective diagram illustrating a podium pole, according to an embodiment of the technology described herein;

FIG. 13 is a perspective diagram illustrating a clamp, according to an embodiment of the technology described herein;

FIG. 14 is a perspective diagram illustrating a wheel assembly, according to an embodiment of the technology described herein;

FIG. 15 is a perspective diagram illustrating podium supporting pole and handle, according to an embodiment of the technology described herein;

FIG. 16 is a perspective diagram illustrating an iron bar, according to an embodiment of the technology described herein;

FIG. 17 is a perspective diagram illustrating a wheel base, according to an embodiment of the technology described herein;

FIG. 18 is a perspective diagram illustrating a pedal wheel mechanism, according to an embodiment of the technology described herein;

FIG. 19 is a perspective diagram illustrating a pedal arrangement, according to an embodiment of the technology described herein;

FIG. 20 is a perspective diagram illustrating a four wheel foot divider arrangement, according to an embodiment of the technology described herein;

FIG. 21 is a perspective diagram illustrating a back view of a podium standing base, according to an embodiment of the technology described herein;

FIG. 22 is a perspective diagram illustrating a pedal bike without the podium, according to an embodiment of the technology described herein;

FIG. 23 is a perspective diagram illustrating a five-wheel chain bike without a podium, according to an embodiment of the technology described herein;

FIG. 24 is a perspective diagram illustrating a five-wheel chain bike with a podium, according to an embodiment of the technology described herein;

FIG. 25 is a perspective diagram illustrating a pedal bike with a podium, according to an embodiment of the technology described herein;

FIG. 26 is a perspective diagram illustrating writing pad and dual cam enabled projector on a pedal five wheel base with podium, according to an embodiment of the technology described herein;

FIG. 27 is a perspective diagram illustrating movement with the chain wheel podium, according to an embodiment of the technology described herein;

FIG. 28 is a perspective diagram illustrating the internal mechanisms of the chain wheel podium, according to an embodiment of the technology described herein;

FIG. 29 is a perspective diagram illustrating pedals, according to an embodiment of the technology described herein;

FIG. 30 is a perspective diagram illustrating a chain moving pedal comfort arrangement, according to an embodiment of the technology described herein;

FIG. 31 is a perspective diagram illustrating a chain wheel cover hood and supporting poles, according to an embodiment of the technology described herein;

FIG. 32 is a perspective diagram illustrating a chain wheel cover plastic hood, according to an embodiment of the technology described herein;

FIG. 33 is a perspective diagram illustrating a height adjustable single pole chair, according to an embodiment of the technology described herein;

FIG. 34 is a perspective diagram illustrating a pedal podium connected to a single pole wheel chair, according to an embodiment of the technology described herein;

FIG. 35 is a perspective diagram illustrating a multiple tab system in use and having a dual cam and microphone, according to an embodiment of the technology described herein;

FIG. 36 is a perspective diagram illustrating a dual cam and microphone arm, according to an embodiment of the technology described herein;

FIG. 37 is a perspective diagram illustrating a digital podium, according to an embodiment of the technology described herein;

FIG. 38 is a perspective diagram illustrating a tactile enabled laser display from a mini projector, according to an embodiment of the technology described herein;

FIG. 39 is a perspective diagram illustrating a permanent digital podium, according to an embodiment of the technology described herein;

FIG. 40 is a perspective diagram illustrating a dual tablet, according to an embodiment of the technology described herein;

FIG. 41 is a perspective diagram illustrating a student in use of the dual tablet;

FIG. 42 is a perspective diagram illustrating a dual tablet with finger print recognition for polling, according to an embodiment of the technology described herein;

FIG. 43 is a perspective diagram illustrating a solar powered dual tablet, according to an embodiment of the technology described herein;

FIG. 44 is a perspective diagram illustrating a back view of the solar powered dual tablet depicted in FIG. 43;

FIG. 45 is a perspective diagram illustrating a security system display, according to an embodiment of the technology described herein;

FIG. 46 is a perspective diagram illustrating a roof-top solar assembly, according to an embodiment of the technology described herein;

FIG. 47 is a perspective diagram illustrating a solar panel for the roof-top solar assembly;

FIG. 48 is a perspective diagram illustrating a wall insert solar panel mounting frame and ventilator, according to an embodiment of the technology described herein;

FIG. 49 is a perspective diagram illustrating a solar power mount frame shown mounted into a wall, according to an embodiment of the technology described herein;

FIG. 50 is a perspective diagram illustrating a solar power storage system utilized to supply power to duals tablets in a classroom, according to an embodiment of the technology described herein; and FIG. 51 is a perspective diagram illustrating a solar power enabled school configured to power multiple digital podium systems, according to an embodiment of the technology described herein.

DETAILED DESCRIPTION OF THE INVENTION

Referring now to the FIG. 1, Classroom enabled with Starch. The complete System (Digital podium-1 and dual tablet-60 run by solar power supply) of starch in use, students are using dual tab (60), some are using right hand and some other are using left hand for writing, by sliding with the help of sliding rail (67). while the teacher standing on the base of the five wheel digital pedal podium and using available classroom permanent projector (102) to focus on screen (102a) for displaying the work that he is doing in the multi-tab (FIG. 2-17).

Referring now to the FIG. 2, Podium base (1) is one and half inch flat iron plate to support wheels (2), four pedals (4) and to mount the podium pole (7). The front two pedals (4) are pressed to move forward and back two will be used for backwards, to stop interfering with the back two pedals there is a divider (5a) this divider also works as foot rest. To move forward half of the feet (toes) are used and for backwards ankles should be used.

Referring now to the FIG. 3, In side view you can see the dual cam and microphone arm (30) and its top view shows camera two-(30a), two audio speakers (35), on the top. At bottom you can see the podium pole attachment clamp (13a) and its lock (13b). The clamp (13a) is mounted into the podium pole's ball Baring (13c) port. On the other side you can see a handle supporting hook (13e) and the break wire (13d) as well as its hook (13f).

Referring now to the FIG. 4, the long custom-made tablet (around 17" long and 6" width) (29b) will be inserted into the multitab third layer (32), later it can be attached to tablet power and data transfer inserts (31, 31a, 31b). In order to insert the tablet hand rest rail (24) need to be removed, in this view you also can see the dual cam and microphone arm mounting threads (30g).

Referring now to the FIG. 5, Multi-tab, dual cam and microphone, arrangement view In the second layer of the multi-tab frame (17) there are three different rails (33 33a) to mount three tablets (29, 29a, 29a, and 29b) and hand rest is removed so you can also see dual cam and microphone arm (30). In case you want to mount your personal tablet (any company), just remove one of the tablet and mount yours there.

Referring now to the FIG. 6, Multi-Tab arrangement and front view of mini projector. All the three tablets are arranged in the third layer of frame (17), back side top of the frame there is a writing pad hook connecting pole (23) has a puller (23a), once this pole is pulled out you can hook the writing pad (34) with the help of hook (34b) in order to write on that. Under the writing pad (34) there is a mini laser projector lenses (33a) out is there.

Referring now to the FIG. 7, Multi-tab frame bottom view. Multi-tab frame (17) back view has the fitting arrangement for handle (16), a front wheel brake handle (15) is mounted on the handle (16), and this front wheel brake handle (15) will be connected to the front wheel brake (15a) with a brake wire (13d). Opposite to the handle (16) on the other sides of the frame you can see there are two sets of USB (19) plug-in ports. In the middle it has audio in and out ports (19b). To give stability to the frame and handle the handle (16) will be connected to the podium pole with the help of two clamps (16a). Under the frame there are four audio speakers (35) and at front there are more audio, video in and out (19c) ports. Opposite side there are more audio video ports for commercial set up (film, TV and event management industry) and power-in and charging connections (19d) are there.

Referring now to the FIG. 8, Multi-tab inner layers. There are three different layers (36,36a,36b and 36c) to arrange circuit board, energy storage battery, mini projector mounting rails, and third layer for mounting three tablets.

Referring now to the FIG. 9, Multi-tab internal layer ($1^{st}$) and mini laser projector arrangement. The first layer (rack) (36) is for the circuit board and for the battery. From the first layer to about second layer height, there is a length and width adjustable rail arrangement (33) for mounting cell phone, portable tablets, micro projectors and touch sensitive laser micro projectors (presently available in the market).

Referring now to the FIG. 10, Ball baring clamp to join podium pole and multi-tab frame. The ball baring clamp has a curve place (13g) to tilt the multi-tab frame and for the smooth movement there is two lined ball-baring (13h) arrangement is there.

Referring now to the FIG. 11, The ball baring clamp is welded to threaded pipe. The clamp is welded with a pipe (13i) to fit inside the podium pole.

Referring now to the FIG. 12, Podium Pole—Supporting parts. In this diagram you can see, how the threaded pipe (13i) will be mounted into the podium pipe at handle rotating ball bearing arrangement (13c). To give more stability to the handle, an extended hook (13e) is there, to organize the external cables and the brake wire (13d). Additionally, there are two cable hooks (13k). When the pole height adjusting keys (9) are rotated, the pole height will be extended, the ball screw attachment mount (131) pushes the podium pole extendable internal bar (11). To cover the ball screw arrangement there is a cover for extending bar (10). Podium pole upper part (13) has ball bearing arrangement and the lower part (12) has the height adjustment ball screw mechanism.

Referring now to the FIG. 13 Round iron ring clamp with flat mounting plate. The "U" ring (16d) is locked in the clamp with the help of clamp mount (16e) to mount the multi-tab frame there is a punched mounting bracket (16f) with thread holes (16g) for bolts.

Referring now to the FIG. 14, five wheels and four pedals (4) are designed to give slow movement; there are locks (5) to stop the pedal wheels (2). The divider (5a) prevents the movement of two sides; in case of diminished light inside the building there are lights (6b) and speakers (6a) to give the horn. For temporary stops, a front wheel brake (15a) can be used.

Referring now to the FIG. 15, Podium supporting pole and handle back view. The handle (16) works as wheel turn control, multi-tab tilt control and as well as support for the person to stand. There is a front wheel brake handle (15) attached to the handle (16), and the clamp (16d) stabilizes the handle (16) and the multi-tab connection. For extra stability there is a handle support extension is there on the podium pole. There are two brake wires (13d), brake wire hooks (13f) to hold and organize the entire brake wires (13d) passing through the pole.

Referring now to the FIG. 16, Custom Punched one and half inch iron bar. Podium is constructed on the movable wheel base (1), base is nothing but a custom punched one and half inch flat iron plate.

Referring now to the FIG. 17, Pedal wheel base and its internal parts. To mount pedal and wheel rotating road (2c), there are four custom made square cut spaces (1b). To move the wheel front and back there is a wheel rotate "U" curve (2b, c) is there. To mount podium pole at front there a circular punch (1a) with threads.

Referring now to the FIG. 18, Pedal wheel mechanism. To mount the pedal on the base in order to push the wheel rotating "u" curve pedal if needs a pipe clamp (4a), this will enable the pedal to move up and down into the square space while pushing the "curve up and down, so corresponding that wheels will move.

Referring now to the FIG. 19, The two sided hook (4a) joins both the "u" curve and the pedal pipe in order to create the rotating movement by moving up and down. In order to separate the leg movement and to prevent touching the two pedals while pushing other there must be a divider required. To mount the divider's (foot rest) there are eight mounting poles (6d) on the base.

Referring now to the FIG. 20, to lock the pedal movement each individual pedal has a lock (5), if you moves one of your feet forward in between one of the two locks, it will lock those two pedals. If you moving forward and using front two pedals so the back two pedals are not to be interacted, so for that there is a divider (5a). While moving forward both the toes are working and during backwards both the angels will be in working.

Referring now to the FIG. 21, podium standing base back view. At the back side of the podium base there is a lock (3), this lock has two parts on will insert into the chair and the other one will be locked with wheel chair bar (39d-FIG. 33) lock.

Referring now to the FIG. 22, Pedal bike without podium. You can see the podium pole is mounted on the five wheel base with pipe handle (16) and these five-wheels can be stopped by pressing a brake handle (15) with the help of front wheel brake (15a).

Referring now to the FIG. 23, Podium with five wheel chain bike. This bike run by a chain wheel axle, the two pedals (4) are connected to a chain wheel axle. This type five wheel has only one pedal lock (5), a brake handle (15), front wheel brake (15a), and hood (6d) to cover wheel chain, on the hood it has a light and horn (6c) arrangement too.

Referring now to the FIG. 24, Podium with five wheel chain bike. The chain wheel bike is now mounted with Multi-tab frame (17), on podium pole there is a two sided extinction of foot rest (8) and back of the base it has a lock system (3) for the wheel chair.

Referring now to the FIG. 25, Pedal bike with podium is shown.

Referring now to the FIG. 26, Writing pad and dual cam enabled with mini focusing projector on pedal five wheels podium. On five wheels podium you can see a person placed his one foot on foot rest (8), fixed the writing pad (34) to the hook (23a) and focusing it through the dual cam arm (30a) from the mini projector (available in the market) on to a screen (33b). Recommended mini projectors presently available in the market can be used with the system.

Referring now to the FIG. 27, Moving on chain wheel podium inside the building In this figure you can see a person using both the chain pedals (4) and moving forward by controlling handle (16).

Referring now to the FIG. 28, Chain podium internal mechanism To arrange the chain at lower height and to move the Peron on the top of it, the base (1) is custom designed with a one and half inch flat iron plate and it is square punched (cut) to arrange the chain axle (4f) with road (4e). The axle rode is attached to a pedal mount (4i) in order to mount pedal (4—FIG. 29), for giving support to the pedal there is a rotating wheel (4j) with extended curve rode (4k). So when the chain (4h) is connected to the front wheel axle (2d) road, those wheels (2) will be moved when the pedal is pressed down. Simultaneously when one pedal goes down the other side pedal mount (4f), (4) will move up. In this figure you can also see the podium pole mounting threaded hole (1a) at front of the wheels.

Referring now to the FIG. 29, Pedal mounted on the two extension rods In order to give support to the feet pedal (4) is mounted on the two extended rods of axle wheel and supporting wheel.

Referring now to the FIG. 30, Chain moving pedal comfort arrangement. To give extra support for foot, pedal is designed with extended edge (4 kJ) and to lock these two pedals there is a single lock (5), when lock is pressed down, lock extinctions will exit through lock out (5c) ports.

Referring now to the FIG. 31, Chain wheel cover support pole In order to mount a hood to cove the mechanical system there are four extended hood mounting poles (6d) on the base.

Referring now to the FIG. 32, Chain wheel covered with plastic hood. The hood (6e) covers the mechanical system and also gives support to the light and horn (6c) to as prevents from any accidents. To mount the front wheel there is a mounting extinction (6f) at front. In order to stabilize the pedal there is a clamp (4l) on both sides of the each pedal.

Referring now to the FIG. 33, Height adjustable single pole chair. This chair (36) is uniquely designed to combine with the five wheel pedal bike and as well with the chain pedal five wheel bikes. In order to combine with any one of these bikes there is an insert lock (38) at bottom of the chair (40) attached to the pole (36a) by a ring mount (36b) and a base (35). Base also supports the four wheels (37) with their rods. The pole (Mechanical pole) height can be adjusted by rotating the key (36c). To support the examiners trunk there is an extra height extended curved pipe (40a) is attached to the trunk supporter (40b). To create complete stability to move along with the podium bike there is an extendible pipe (39). This pipe is tilt enabled due to the joint arm clamp (39a), when required move the arm by rotating the key (39e) and lock to the base of podium bike with the help of lock key (39d).

Referring now to the FIG. 34, Pedal podium connected with a single pole (actuator) wheel chair. In this figure you can see how the arm is locked with podium lock (3) and how the arm (39d) is separated from the chair.

Referring now to the FIG. 35, Dual cam, microphone and multi-tab system is in use. In this picture you can see how a teacher is recording her group activity with front cam and her instructional teaching using microphone (30c) with back cam (30a). The Multi tab is enabled and back cam's output can be seen in the two screens (42), and front cam's output is also monitored in third tab (44). At the same time teacher editing at real time with the help of operating keys (45) as well as she is saving it in the system. The wheel chair (36) is connected to the five wheel podium so the teacher can move around and as well as shoot with two different cams at different angles, further she can edit it at real time.

Referring now to the FIG. 36, FIG. 36: Dual cam and microphone arm This dual cam and micro phone arm (30) have two digital video cams (30a, b) front and back to capture video same time in both directions (teacher and students) if any external camera, or audio devises are using to record anything those also can be attached to the system through the audio video in and out ports (19,19a, 19b, & c—FIG. 7). Any external dives can also be connected to the multi-tab through thunderbolt or wireless/wireless USB, etc.

Referring now to the FIG. 37, Digital podium functions in the classroom. The is an example model, how you can use podium regularly in the classroom during the class time, a teacher can monitor her/his school, classroom, and be able to communicate with his/her students as well as with administrative staff without moving and talking. The total "18" number of students in row (47), but one student Sam (not a real name) (47a) trying to communicate with teacher and teacher sent warning to another student (46) to Be Quit. Other student sent a request for Rest room Pass (48). However, she already has a student in the restroom from last fifteen minutes (52) so it is time to Contact Administrator (52a). However all the administrators will get immediate alerts automatically from the system into their cellphone app. In order to issue a restroom passes to another student. Teacher can get information through the system from all the restrooms in the school via wireless display system on each rest room (FIG. 45). So before she/he issue a pass first she/he reports about one of his/her student not reporting to class back and can issue a new pass to another student according to the vacancy in the nearest rest room accordingly. In case of system failure student can press the button available in the restroom for help. While all this happening teacher can record her teaching and monitor in one tablet (51) as well as she/he can preview the teaching material she/he want to send into student's dual tab (FIG. 40) or to the permanent projector/mini projector (38) as well teacher can write directly on one of the tabs (50) and focus it simultaneously. If, teacher want to use his personal tablet (any brand) into the multi-tab port, it is possible too. So students can watch teacher examples on the board and they can do their assignment given to them in the dual tab (FIG. 40), as well as watch the prerecorded tutorial already sent to them. Other than that teacher can differentiate teaching for any student (FIG. 41), in case of such requirements of gifted, exceptional, or any other such individual requirements. Individualized teaching through pre-designed audio-video material and reading, writing material at the same time teacher can give individual attention immediately as required. Infect the exceptional student also can have individualized audio-visual material (prerecorded video, audio, modified reading and teaching material) through dual tab (40). Furthermore each student can go back and forth of the topics or topic related to the content with the help of dual tab and can have his/her required volume with the help of wireless ear phones (FIG. 43-72), in order to prevent allergies school systems must provide individual wireless ear-phones.

Referring now to the FIG. 38, Tactile enabled laser display from mini projector. Presently in the market there are many mini projectors, in order to mount them there is a length and width adjustable mini projector come cell phone port (FIG. 9-33). You can mount the mini laser projectors or any cell phone for display. Once you place the laser tactile enabled mini projector in the port (FIG. 9-33) it will display through the lenses (FIG. 6-33a), (54). However the lenses (FIG. 6-33a) also can be adjustable according to the distance of board or wall. In the present figure you can see how you can work with tactile enabled laser display (53). It will work, when you touch where ever the touch is enabled (55).

Referring now to the FIG. 39, permanent digital podiums. Permanent podium also has the same features just like the pedal and chain wheel podium except the operating wheel instead of operating base, permanent podium has unmovable permanent stand (58). You can fix temporary wheels (57) in to the given threads (59), when you want to move it from one place to another place. Preeminent podium also has a two side foot rest (13p) and a program display board (56). More over each presenter can slide their personal phone, or tablet into the system if they want to present anything.

Referring now to the FIG. 40, Dual tablet. This is nothing but two screened tablet (60), one side is for display (64) and the second screen (62) is completely dedicated to writing. However, in case of individual requirements (example FIG. 42) you can also customize the dual tablet. The display screen is non-tactile and only displays the things relayed by the teacher from the multi-tablet (FIG. 24-17) this will completely eliminate the bad browsing problems of students in the classroom. However, student can watch previous lessons, or presentations with the help of operating keys (63) and can view missed things using the four way key (63c) as well as he/she can also download the lessons into the USB drive by inserting their own personal USB drive. However, their personal files cannot be displayed or played in any of the screens, due to the customized software in the system. The screen one is tactile enabled however also can write with any touch screen pen available in the market. In this screen student can write without any rules (62a) and can enable rules (62b) when he/she want with the help of operating keys (63)at both right and left side. Same functionality keys are given both right and left (63, 63d)) side for the convenience of left handed and right handed students. When required you can also draw graphs with the help of graph lines at required place in the paper and rest of the place you can leave it as white paper (62c, 62d). While writing to place hand pam weight there is a pam rest place (61). With the help of operating keys student can communicate with teacher without saying a word, for instance operating keys or customized for students expressing their requirements of nurse pass, restroom pass, help in class work, any emergency etc., as well as teacher can also send her/his requests, requirements, expectations, remainders, warnings into the display screen. Written tests can be opened directly in the writing tablet, whereas, the test instructions can be displayed with example audio and video along with teacher instructions.

Referring now to the FIG. 41, A students using dual tablet in the classroom. For the convenience of left handed people the dual tab book can be slide to left side, because the dual tab is mounted on the rail (67) attached to the student desk. When the student changes, according to his/her physical habits, he/she can slide it, and can log of from the system when finished. The dual tab runs on 12 volts Direct current stored in the battery (FIG. 50-96), however there is a personal battery in the dual tab can be run for hours (depend on the battery chosen by customer). In case both batteries are out of charge, the power supply system automatically shifts to regular power supply in emergency. So you have only one supply cable (68), form custom designed supply system (66) from the ground. The person in this picture slide (moved) the dual tab to left side and writing with writing stick (65) with his left hand, once the period ends, the next student comes, he can slide it back to right side.

Referring now to the FIG. 42, Dual tablet enabled with finger print recognition for public poling. Dual tablet can be used for different purposes when it customized. Here dual tablet is customized for public poling by a custom designed finger print recognizing (62g) software (will be designed with the help of professionals) in order to conduct the public opinion pole. The circular box is the place for contestant ID picture (62f), and his campaign symbol (62e). Finger prints or recognized due to the pressure applied on the tactical screen in to a color filled box (62), due to the pressure the color in the box spreads around and the fingers impression will be recognized immediately according to the memory preloaded into the system. However, in order to stop the interference of the previous finger marks screen will be made with anti-finger mark material.

Referring now to the FIG. 43, Solar powered dual tablet. A custom built the two sided solar panel (purchased form market) (69), this panel is tiltable due to the inbuilt pipe setup (71). In case, if screen is invisible due to the sun light, in order to prevent that screen can be tilted with the help of screen tilting hook (70). To personalize the audio there are two wireless audio speakers (ear phones) (72) at left side of the screen two.

Referring now to the FIG. 44, Solar powered dual tablet back view. Second side of solar panel (69a), rile insert (73) and circuit board cover (74) as well as battery cover 75) can be seen at the back view of the solar power dual tab (also same for the regular dual-tablet).

Referring now to the FIG. 45, Security system display on school restroom with number locked doors. The display (78) is just a display screen available in the market; however this will be operated by the custom designed software in order to control the student pass, as well as to control the security problems from outside. You can operate any door with the number lock sensor (already available in the market). Issued pass will be displayed in the display board (79) with a unique identifying number (80) but the number lock is only issued to the student in his dual tablet whenever student requests the teacher. This two numbers (door key and pass number) are issued by the system run software, so same number will not be issued twice. Once the student (person) enters into the restroom (any room or designated place) by dialing his key number on door dial pad (76), from that movement his time will be activated (81). However, in teacher's monitor she/he can watch both the times (after entering the restroom and the time from the classroom) in the multi-tab. If the school system wants to use the pass number for visitors, a digital token printer (available in the market) should be programmed with the system. Once the visitor punches the pass and dials that number on the front door dial pad, from that movement visitor's picture and as well as his timer will be enabled automatically and will be available to any of the teacher who gets the admin pass. If the system also includes the digital metal detector come scanner at front door, this will reduce maximum sudden threats from outside.

Referring now to the FIG. 46, Solar panel mounting frame come sunlight ventilator. This is (84) just a sheet metal and wood molded rectangular shape box with four sided solar frame (85, 85a) to insert the solar panel (96b). on the top it has transparent glass (87) to pass the sun light and at the bottom of the glass there are four plastic pipes (88) for inserting the self-censure (censors will be purchased from market) solar lights (these lights will automatically on when the sun light gets down in the morning time. To insert the frame into the roof there is extinction (85b) at back side of the frame.

Referring now to the FIG. 47, Solar panel mounted on one side of frame. While the solar panel (purchased from market) (96b) is being mounted into the one side of frame, you can adjust the flow of the electricity with the help of two way cotter inch pin power cable in series or parallel circuit according to your requirement.

Referring now to the FIG. 48, Wall insert solar panel mounting frame come ventilator. To insert into the wall there is extinction (92) for the frame, the glass ventilator (87) is arranged flat due to the frame to be inserted into the wall. The self-censored light mount pipes (88) are also there under the mirror, wall insert also has four sides' frame (86) and supply pins (85) are there. However the fourth panels frame (91) is very small due to the lack of space.

Referring now to the FIG. 49, Solar panel mount frame when inserted into the wall Inside the room, frame has curve glass (93) ventilation and the extinction (95) for the proper wait control on the wall (94) can be seen in this figure, frame also requires back side support.

Referring now to the FIG. 50, Solar power storage system as well as supply method for dual tablets in the classroom. Once the solar panel frames are arranged on the side of the walls and on roof, ventilators (9) will give sunlight as well as supply power (from solar panels) to the storage system (96) in to each class, room. The stored power will be supplied through a systematic wired through side of the walls (97a) as well as in the floor (97). However, each system (multi-tab, dual-tab and display system) has their individual storage battery system once they are charged they work at an average of 7-12 hours and the power stored in the main system (96) in each classroom works as back up vice versa. In case of emergency regular supply will be used automatically. Even individual room AC (99) system also runs by the solar power with proper monitoring arrangement (required solar technology is already available in the market). For more ventilation each side of the wall must have two air-tite transparent glass windows. Usually schools and universities will have larger building structures if all these enabled with STARCH, they also become larger sources of electricity. The extra stored power (electricity) during holidays can be uploaded into the State or National supply system, so by that educational systems also can earn some extra money to spend their projects.

Referring now to the FIG. 51, A model two stair school building completely enabled with solar power by mounting frames on wall and roof to run STARCH as well as for common use. The solar panels mounted on the roof (84), side of the wall (90), and minimum two air-tite glass windows (98) on each side of the class room. Schools should always have alternative to save power like here this school has on regular stairs (100) (to save power) and lift (100a).

The invention claimed is:

1. A digital podium apparatus comprising:
a base;
a pair of rotatable front wheels and a pair of rotatable rear wheels operably coupled to the base;
a single wheel rotatably coupled to a front of the base;
a pair of front pedals movably supported by the base and operably connected to the pair of front wheels, the pair of front pedals capable of being moved by a user's toes to cause the front wheels to rotate and move the base forward;
a pair of rear pedals movably supported by the base and operably connected to the pair of rear wheels, the pair of rear pedals capable of being moved by the user's ankles to cause the rear wheels to rotate and move the base backward;
a divider disposed between the pair of front pedals and the pair of rear pedals, the divider mounted on the base and extending laterally in a side-to-side direction of the base;
a height-adjustable pole having a lower end thereof coupled to the single wheel;
a digital podium frame coupled to an upper end of the height-adjustable pole;
a handle disposed on the digital podium frame, wherein the user can change a direction of the base during movement of the digital podium apparatus by rotating the handle to thereby cause rotation of the height-adjustable pole and the single wheel;

a plurality of computer tablets disposed on and supported by the digital podium frame; and wherein the digital podium apparatus is capable of being ridden into a classroom with students and is configured to project and relay teaching material to available classroom projectors, or through a mini laser projector mounted on the digital podium apparatus, and into a dual tablet notebook of each student in the classroom.

2. The digital podium apparatus of claim 1, further comprising:

a pair of lights and a pair of speakers disposed on a cover attached to the base.

3. The digital podium apparatus of claim 1, further comprising:

a foot rest disposed on the height-adjustable pole;

a plurality of speakers disposed on the digital podium frame; and a plurality of audio, video, and power in and out ports disposed on the digital podium frame.

4. The digital podium apparatus of claim 1, further comprising:

a movable arm rest disposed on the digital podium frame.

5. The digital podium apparatus of claim 1, further comprising:

a dual camera and microphone arm disposed on the digital podium frame.

6. The digital podium apparatus of claim 1, further comprising:

a hand grip disposed on the digital podium frame configured to enable the user to rotate or tilt the digital podium frame up and down.

7. The digital podium apparatus of claim 1, further comprising:

a brake handle disposed on the digital podium frame and operably connected with a brake configured for engagement with the single wheel, thereby providing braking for the digital podium apparatus.

8. The digital podium apparatus of claim 1, wherein the base of the digital podium apparatus is capable of being attached to a chair having four wheels configured for supporting the user of the digital podium apparatus.

* * * * *